United States Patent
Kalevo

(10) Patent No.: US 10,531,110 B2
(45) Date of Patent: Jan. 7, 2020

(54) ENCODER, DECODER AND METHOD

(71) Applicant: GURULOGIC MICROSYSTEMS OY, Turku (FI)

(72) Inventor: Ossi Kalevo, Akaa (FI)

(73) Assignee: Gurulogic Microsystems Oy (FI)

( * ) Notice: Subject to any disclaimer, the term of this patent is extended or adjusted under 35 U.S.C. 154(b) by 198 days.

(21) Appl. No.: 15/327,357

(22) PCT Filed: Jul. 21, 2015

(86) PCT No.: PCT/EP2015/025053
§ 371 (c)(1),
(2) Date: Jan. 18, 2017

(87) PCT Pub. No.: WO2016/012105
PCT Pub. Date: Jan. 28, 2016

(65) Prior Publication Data
US 2018/0213248 A1 Jul. 26, 2018

(30) Foreign Application Priority Data
Jul. 21, 2014 (GB) .................................. 1412937.3

(51) Int. Cl.
*H04N 19/51* (2014.01)
*H04N 19/593* (2014.01)
(Continued)

(52) U.S. Cl.
CPC ........... *H04N 19/51* (2014.11); *H04N 19/107* (2014.11); *H04N 19/124* (2014.11);
(Continued)

(58) Field of Classification Search
CPC .... H04N 19/51; H04N 19/107; H04N 19/124; H04N 19/503
See application file for complete search history.

(56) References Cited

U.S. PATENT DOCUMENTS

| 2012/0133532 A1* | 5/2012 | Hunt | ...................... H03M 7/30 341/87 |
| 2014/0112589 A1 | 4/2014 | Kalevo et al. | |

(Continued)

FOREIGN PATENT DOCUMENTS

| EP | 2611158 A1 | 7/2013 |
| EP | 2 723 071 A1 | 4/2014 |

(Continued)

OTHER PUBLICATIONS

Applicant's Response to the Examination Report under Section 18(3) PA77, dated Nov. 3, 2017, in corresponding Application No. GB1412937.3, 14 pages.

(Continued)

*Primary Examiner* — Jamie J Atala
*Assistant Examiner* — Hesham K Abouzahra
(74) *Attorney, Agent, or Firm* — Eric L. Sophir; Dentons US LLP

(57) ABSTRACT

There is provided an encoder for encoding input data to generate corresponding encoded data. The encoder is operable to process the input and to encode at least a portion thereof using at least one Delta encoding algorithm, and to generate one or more predictors for use in encoding one or more subsequent portions of the input data, wherein the encoder is also operable to encode data generated by the at least one Delta encoding algorithm and the one or more predictors by employing at least one entropy encoding algorithm to generate the encoded data. There is provided a decoder for decoding the encoded data to generate corresponding decoded data; optionally, the decoded data and the input data are mutually similar.

28 Claims, 8 Drawing Sheets

(51) Int. Cl.
*H04N 19/91* (2014.01)
*H04N 19/503* (2014.01)
*H04N 19/107* (2014.01)
*H04N 19/124* (2014.01)

(52) U.S. Cl.
CPC ......... *H04N 19/503* (2014.11); *H04N 19/593* (2014.11); *H04N 19/91* (2014.11)

(56) References Cited

U.S. PATENT DOCUMENTS

| | | | | |
|---|---|---|---|---|
| 2014/0173674 A1* | 6/2014 | Wolman | ............. | H04N 21/25 725/116 |
| 2014/0226914 A1* | 8/2014 | Mocanu | ............. | G06T 5/003 382/255 |
| 2014/0348235 A1* | 11/2014 | Yamamoto | ......... | H04N 19/176 375/240.12 |
| 2015/0215618 A1* | 7/2015 | Bretscher | ........... | H04N 5/23229 348/262 |

FOREIGN PATENT DOCUMENTS

| | | |
|---|---|---|
| EP | 3005350 A2 | 4/2016 |
| GB | 2503295 A | 12/2013 |
| GB | 2505169 A | 2/2014 |
| GB | 2511355 A | 9/2014 |
| JP | 4223577 B2 | 2/2009 |
| RU | 2236046 C2 | 9/2004 |
| WO | 2011024602 A1 | 3/2011 |
| WO | 2013178524 A1 | 12/2013 |
| WO | 2014187988 A2 | 11/2014 |

OTHER PUBLICATIONS

Intention to Grant under Section 18(4), dated Mar. 16, 2018, in corresponding Application No. GB1412937.3, 2 pages.
Great Britain Examination Report dated Jun. 12, 2017 in Application No. GB 1412937.3 (3 pages).
Great Britain Examination Report dated Nov. 28, 2016 in Application No. GB 1412937.3 (4 pages).
Great Britain Combined Search and Examination Report dated Jan. 28, 2015 in Application No. GB 1412937.3 (7 pages).
Russian Examination Report (with English translation), dated Dec. 25, 2018, issued in corresponding Russian Application No. 2016152660/08, 8 pages.
Russian Search Report (with English translation) dated Dec. 25, 2018, issued in corresponding Russian Application No. 2016152660/08, 4 pages.
D. Salomon, "Data Compression", Sep. 20, 2009 [found on Dec. 24, 2018], URL:http://en.pudn.com/Download/item/id/769449.html., 920 pages.
Japanese non-patent literature. Translation of bibliography: Okubo, Sakae (Supervising editor), "Impress standard textbook series, revision 3, H.264/AVC textbook", ver. 1, Jan. 1, 2009, Impress Corporation R&D, pp. 18, 19, 28, 29, 86-89, 97, 98, 110-116, ISBN: 978-4-8443-2664-9.
Japanese non-patent literature. Translation of bibliography: Sugiyama, Kenji, "Video Signal Processing with C Programming Language", Corona Publishing Co, Ltd, pp. 14-16, 39, 40, ISBN: 978-4-339-00794-7; Mar. 18, 2008.
Japanese Office Action (with brief English Summary), dated Jul. 2, 2019, issued in corresponding Japanese Application No. 2017-501351, 38 pages.
"Variable-length code", Wikipedia (accessed Nov. 28, 2012), URL: http://en.wikipedia.org/wiki/Variable-length_code.
"Run-length encoding", Wikipedia (accessed Nov. 28, 2012), URL: http://en.wikipedia.org/wiki/Run-length_encoding.
"Huffman coding", Wikipedia (accessed Nov. 28, 2012), URL: http://en.wikipedia.org/wiki/Huffman_coding.
"Arithmetic coding", Wikipedia (accessed Nov. 28, 2012), URL: http://en.wikipedia.org/wiki/Arithmetic_coding.
"A Mathematic Theory of Communication", Shannon, Claude E. (1948) (accessed Nov. 28, 2012), URL: http://cm:bell-labs.com/cm/ms/what/shannonday/shannon1948.pdf.
"Delta encoding", Wikipedia (accessed Nov. 28, 2012), URL: http://en.wikipedia.org/wiki/Delta_coding.
Shannon's source coding theorem; Wikipedia (accessed Nov. 28, 2012), URL: http://en.wikipedia.org/wiki/Source_coding_theorem.
"Entropy"—Wikipedia (accessed Nov. 28, 2012), URL: http://en.wikipedia/wiki/Entropy.
Differential pulse-coding modulation; (accessed Jan. 17, 2017), http://en.wikipedia.org/wiki/DPCM.
David Salomon, Data Compression, The Complete Reference, Fourth Edition, Jan. 23, 2007, XP002746136, pp. 1-1118.
Xiaolin Wu et al., "Context-Based, Adaptive, Lossless Image Coding," IEEE Transactions on Communications, vol. 45, No. 4, Apr. 1997, pp. 437-444.
International Search Report issued in International Application No. PCT/EP2015/025053 dated Nov. 3, 2015.
Written Opinion of the International Searching Authority issued in International Application No. PCT/EP2015/025053 dated Nov. 3, 2015.
Notification of Transmittal of the International Preliminary Report on Patentability issued in International Application No. PCT/EP2015/025053 dated Nov. 4, 2016.
Applicant's Response to Written Opinion of PCT Chapter II Substantive Examination of International Application No. PCT/EP2015/025053 dated Aug. 12, 2016.

* cited by examiner

FIG. 4

ENCODER, DECODER AND METHOD

CROSS-REFERENCE TO RELATED APPLICATIONS

This application is a National Stage of PCT/EP2015/025053, filed Jul. 21, 2015, which claims priority under 35 U.S.C. § 119 to GB Application No. 1412937.3, filed Jul. 21, 2014, all of which are incorporated herein by reference in their entirety.

TECHNICAL FIELD

The present disclosure relates to methods of encoding data, for example to a method of encoding data using Delta coding which employs one or more predictors. Moreover, the present disclosure relates to methods of decoding data, for example to a method of decoding data using Delta decoding which employs one or more predictors. Moreover, the present disclosure relates to systems, apparatus and devices for implementing aforementioned methods. Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

Conventionally, in general, many video codecs, for example MPEG-4, H.264, VC-1, HEVC and VP9, are able to utilize previous frames for motion estimation of image blocks; these example codec names include trademarks. Motion estimation and motion compensation are executed block-by-block for each video image frame. Similarly, de-duplication methods or processing via use of databases can be used to utilize already coded data blocks or data packets when encoding a given current data block or data packet. Delta coding can be used for reducing entropy of data symbols present in video or similar types of content. ODelta coding, as will be elucidated in greater detail below, is also optionally used for further reducing entropy of data symbols. Moreover, ODelta coding makes it possible to reduce the entropy of individual bits; methods associated with ODelta coding will be described in greater detail later in APPENDIX 1. Both DPCM-style methods, namely Delta coding and ODelta coding, utilize previous data values when creating an encoded data value for an entropy encoder.

On account of the amount of data and its transfer are contemporarily increasing rapidly, a need for data compression is also increasing, and new and better methods are needed to improve the efficiency of data compression. The data can, for example, be captured from one or more sensors, for example images, video, audio, measurement data, or be various types of binary data, ASCII data and so forth; a mixture of captured sensor data and abstract data is also feasible.

There are multiple coding methods presently available when encoding data, but none of them offer a good enough compression ratio for all different kinds of data. When encoding a given current channel, frame, data block or data packet, there is often also a need to code different data channels or frames, for example color (English: "colour"), image channels, audio channels, parallel data measurement, separate images in video, separate packets in audio, 3D images, 3D audio and so forth, separately, while still utilizing information of already coded channels, frames, data blocks or data packets. Known data encoding methods are not sufficiently versatile for coping with input data, which has such a wide diversity of data structures therein.

Similarly, the spatial information that is already encoded is also beneficially utilized more efficiently for encoding than by using a known method such as DPCM (http://en.wikipedia.org/wiki/DPCM). There is also a need for simple, but efficient, encoding and decoding methods that enable lossless and lossy coding of data to be achieved. A method is provided via the ODelta method, as will be described in greater detail later in APPENDIX 1, but there is a need to utilize ODelta methods much more efficiently, for example in a manner that modifies typical known Delta coding, making Delta coding from DPCM suitable also to be used with different predictors. Such an approach enables better entropy reduction for negative and positive differences, or sum, values for symbols than conventional known Delta coding as in, for example, DPCM.

There is a lack of known methods that are able to combine both properties, namely data reutilization by employing advanced prediction methods and efficient entropy reduction of residual data with or without quantization, by delivering or storing only the method selection, namely for frame, channel, data block or data packet, and the encoded residual values, namely without any motion vectors, selection symbols or database references. Sometimes, even the residual coding is not needed, because:
(i) the prediction is perfect;
(ii) the residual is constant for all data values, and one value is enough to deliver it; or
(iii) the residual with or without quantization is below an error threshold based on a quality parameter.

SUMMARY

The present invention seeks to provide an improved method of encoding data, based upon use of Delta encoding algorithms.

Moreover, the present invention seeks to provide an improved encoder for encoding data, based upon use of Delta encoding algorithms.

Furthermore, the present invention seeks to provide an improved method of decoding data, based upon use of inverse Delta encoding algorithms.

Furthermore, the present invention seeks to provide an improved decoder for decoding data, based upon use of inverse Delta encoding algorithms.

According to a first aspect, there is provided an encoder for encoding input data (D1) to generate corresponding encoded data (E2), characterized in that the encoder is operable to process the input (D1) and to encode original values of at least a portion thereof, using at least one Delta encoding algorithm, into delta values that are expressed using a value range that is not increased as compared to a value range of the original values, and to generate one or more predictors for use in encoding one or more subsequent portions of the input data (D1), wherein the encoder is also operable to encode data generated by the at least one Delta encoding algorithm (ODelta, DDelta, IDelta, PDelta) and the one or more predictors by employing at least one entropy encoding algorithm to generate the encoded data (E2), wherein the one or more predictors include at least one of:
(i) one or more temporal predictors;
(ii) one or more local spatial predictors which are subject to quantization; and (iii) one or more local spatial predictors utilizing pre-computed values.

The present invention is of advantage in that a combination of Delta encoding, generation of one or more local spatial predictors, utilizing a variety of different delivery methods of delta values, and entropy encoding is capable of providing highly efficient data encoding.

"Local spatial predictor" is optionally referred to as "local predictor" or "spatial predictor" as an abbreviation.

With reference to pre-computed values, the values can be any values that can be determined before performing the process for the data, based on spatial location; namely; that is, they are not local spatial predictors as in ODelta encoding, as described in APPENDIX 1. Examples of such pre-computed values include a previous block on a left-hand-side or above in relation to a current data block to be encoded, a location of the same data block in some previous channel, view or frame, or internal motion prediction within a given data frame.

The prediction according to the method is typically determined beforehand once and for all. That is, a prediction for a given block is determined beforehand once and for all with either temporal or spatial prediction. In addition to the blocks, channels, views and frames mentioned above, motion estimation is also conveniently considered to be a temporal prediction. Motion estimation can also be performed spatially, in which case it is a question of a spatial predictor defined in element (iv) above. That is, the motion estimation predictions do not always have to differ from one another temporally. The spatial prediction herein differs from the "local spatial prediction" utilized for example in ODelta method, described in APPENDIX 1. When "local spatial prediction" is used the prediction occurs during the method process, and the predictor values are not available before the previous values have been processed. This is different in comparison to temporal predictions and other spatial predictions. Optionally, the prediction can be determined as the process proceeds, as in ODelta (see APPENDIX 1). In such a case, local spatial predictors in Delta coding are used.

Optionally, in the encoder, the at least one Delta encoding algorithm:
(a) using a data processing arrangement for applying to the input data (DA1) a form of differential and/or sum encoding to generate one or more corresponding encoded sequences; and
(b) using the data processing arrangement to subject the one or more corresponding encoded sequences to a wrap around a maximum value and/or a wrap around a minimum value, for generating the encoded output data (DA2 or DA3) (=ODelta).

Optionally, it is also possible to use the Delta encoding algorithm in a following way. If a difference between a given original value and a corresponding predicted value is always zero or positive, or if the difference between the given original value and the corresponding predicted value is zero or negative, with or without quantization being applied, then it is possible to express and deliver only the sign, for example sign bit, of the delta values together with coding algorithm information. Thus, in such cases, wrapping, as employed in the ODelta algorithm, will not be needed at all, because the values will always fit into a given bit count range, even without wrapping. Such algorithms used in this way are conveniently referred to, for example, as an IDelta ("Incremental Delta") method and a DDelta ("Decremental Delta") method. The IDelta method thus delivers only positive delta values, and the DDelta method delivers only negative delta values, however often, beneficially, swapping the sign, namely sign bit. This swapping is done only for DDelta values, and only when delivering them. Both methods described above, of course, are also always able to deliver unchanged values together with a zero symbol/value, whether this unchangedness has been achieved with quantization or without quantization; namely, in such case, the difference between those delta values is not larger than the quantization used.

Moreover, optionally, it is also possible to use delta values together with a pedestal value. This means that if there were to occur both negative and positive delta values but their absolute values were small as regards their dynamic range and bit depth of the data being coded, then it is sometimes beneficial to deliver to the pedestal value of the change, namely the largest negative change, as quantized or not. After that, it is possible to deliver only positive change values, just as in the aforementioned IDelta method. Such a method employing a pedestal value can be conveniently referred to as a. "PDelta method". Often, when the PDelta method is used, the dynamic range/bit depth of the data can be decreased more than when the original ODelta algorithm, see APPENDIX 1, is used. That is, the data can be expressed using less bits because the maximum value of the data will be smaller and therefore the difference between the smallest and the largest possible value will be corresponding smaller; such benefit arises because the original ODelta method, see APPENDIX 1, must always express and deliver the dynamic range of the occurring values, namely the value range of the ODelta values to be delivered.

The IDelta, DDelta and PDelta methods described above are beneficial to use in embodiments of the present disclosure where the prediction that is being used is, for example, the previous block, channel, image or some other set of values determined, and declared, before using these methods. Therefore, the difference between the value being coded and the prediction value is easily determined once and for all, and thus the prediction for the value or the difference is not at all dependent upon the other values being coded. These kinds of predicting solutions, referred to called as "temporal predictors" or "spatial predictors", are also especially very well suited to be used with quantization, because the quantization of the difference values will influence only a single given individual data value to be decoded, and thus the error caused by quantization cannot accumulate into other data values to be decoded. Quantization can be used also with local spatial predictors, but in such a case, the algorithm needs to take into account the quantization error when predicting next value, so that the quantization error does not start cumulating.

Known types of Delta coding are implemented by reducing from a given current value a prediction value, which is achieved by using a local spatial predictor, and the difference of these values can result in both positive and negative values and therefore, the sign always needs to be delivered with the difference value. In ODelta coding, see APPENDIX 1, a difference or a sum of the current value and prediction value can be used and, moreover, delivery of the values is conducted by using wrapping the values, thus resulting in values that are always positive.

As aforementioned, the IDelta, DDelta and PDelta methods differ from the known Delta method, as well as the earlier ODelta method, as described in APPENDIX 1, wherein the prediction value is delivered using wrapping. Further, in the ODelta method described in APPENDIX 1, the predictor to be used is limited to a local spatial predictor utilizing one value only, and it is used always without quantization. However, such limitations are not necessary for the embodiments of the present disclosure which are also utilizing other kinds of predictors and/or quantization, even optionally in combination with the aforementioned ODelta method. It is also feasible to use the original ODelta method that employs wrapping in the IDelta, DDelta or PDelta methods, because it is often a good solution and in some cases it is even a better solution than these aforementioned IDelta, DDelta and PDelta methods. This is because the original ODelta method that employs wrapping is often able to express both positive and negative difference with one and the same wrapped value/symbol. The original ODelta method that employs wrapping performs this in such a way that the positive and negative values can be distinguished from one another later, based on a value range and a prediction value, whereas in these aforementioned IDelta, DDelta and PDelta methods only zero value and positive, or negative difference values are delivered, and thus no other distinguishing is needed in association therewith.

Optionally, information about the used prediction or possibly used quantization is often delivered together with the method selection information. Beneficially, the information on quantization can often be delivered for an entire sequence of data in one go, by using one quantization value or one quality value. Examples of such methods are, for example, IDeltaBlockFromChannel0, PDeltaChannelR_2, DDeltaFrame_4, ODeltaBlockMode and DDeltaPacketPrevQ70. The first one of these methods, namely IDeltaBlockFromChannel0, delivers only positive difference values in relation to the channel 0 values in a given corresponding block, namely each data value in the data block currently being coded is larger than or at least equal to the value in the corresponding location in channel 0 of the block that is used as prediction.

The second one of these methods, PDeltaChannelR_2, delivers a pedestal value followed by positive difference values, namely differences between the current channel and R channel, further quantized by two. The method referred to as DDeltaFrame_4 is well suited for, for example, a gradually darkening image. It delivers negative value changes as compared with the previous frame, quantized by four. The method referred to as ODeltaBlockMode delivers for the current block area wrapped difference values, as compared with the mode value. Optionally, this mode value can be sent/delivered for each block separately, or as predicting mode value the mode value of the entire data channel or the mode value of the entire data frame can be used. DDeltaPacketPrevQ70 delivers negative data values for the current packet, as compared with the previous packet that had the same size and quantization for delta values is defined by using a quality factor 70.

The examples presented above are not construed to limit the scope of protection of the present invention, as defined by the appended claims, because many other similar methods can be used to describe various different embodiments of the method pursuant to the disclosure. Optionally, together with all these methods, data value limits can be delivered, as they are usually maximum values, so that the data being delivered can be compressed as efficiently as possible.

The present disclosure defines and describes an alternative way to use efficiently known encoding methods to encode data in a partial manner, while not interfering with the operation of the encoding algorithms themselves. Thus, the methods of embodiments described in this disclosure below are, for example, beneficially used together with other known methods, or they can replace known coding methods.

The methods of the present disclosure use different predictors and optionally quantizers to ensure lower entropy for any entropy encoder after the operation of these methods of embodiments of the disclosure.

Optionally, the encoder is operable to employ at least one quantization algorithm when encoding the input data (D1) to generate the encoded data (E2), wherein the at least one quantization algorithm results in the encoder providing lossy encoding of the input data (D1).

Optionally, the encoder is operable to employ different algorithms for encoding data of different data structures present in the input data (D1).

Optionally, the encoder is operable to employ RD optimization when encoding the input data (D1) block-by-block. More optionally, in the encoder, the RD optimization is computed within the encoder to minimize a value V of an equation:

$$V=D+\lambda*R$$

wherein the distortion (D) is, for example, a sum of squares error (SE) between the input data (D1) and a representation of the input data (D1) encoded into the encoded data (E2) and decoded into the decoded data (D3), and wherein a rate (R) represents an amount of encoded data measured, for example, as bits.

Optionally, in the encoder, the at least one Delta encoding algorithm (ODelta, DDelta, IDelta, PDelta) and/or the at least one entropy encoding algorithm is operable to employ at least one of: DC methods, slide methods, multilevel methods, DCT methods, line methods, scale methods, database methods, Range coding, Huffman coding, RLE coding, SRLE coding.

Optionally, the encoder is operable to encode the input data (D1) including data structures corresponding to at least one of: YUV channels, BGR channels. More optionally, the encoder is operable to encode data of the channels in an order Y, U, V or in an order G, B, R. The alpha channel, namely the transparency channel, can also be coded separately or together with the other channels. Correspondingly, the data being coded may be audio data, in which case the sound amplitude values, which may have bit depths 8, 16 or 24 for example, can be coded separately channel by channel or many channels at one go. Therefore, whether the data being coded is audio, images, video, genome data, measurement results, text, binary or anything else, the bit depth of the data being coded can vary for one to, for example, 256 bits per data element.

Optionally, the encoder is operable to include such data in the encoded data (E2) which is indicative of one or more encoding algorithms employed by the encoder to encode the input data (D1) to generate the encoded data (E2).

According to a second aspect, there is provided a method of using an encoder for encoding input data (D1) to generate corresponding encoded data (E2), characterized in that the method includes:

using the encoder to process the input (D1) and to encode original values of at least a portion thereof, using at least one Delta encoding algorithm (ODelta, DDelta, IDelta, PDelta), into delta values that are expressed using a value range that is not increased as compared to a value range of the original values;

(ii) using the encoder to generate one or more predictors for use in encoding one or more subsequent portions of the input data (D1); and (iii) using the encoder to encode data generated by the at least one Delta encoding algorithm and the one or more predictors by employing at least one entropy encoding algorithm to generate the encoded data (E2),
wherein the one or more predictors include at least one of:
(i) one or more temporal predictors;
(ii) one or more local spatial predictors which are subject to quantization; and
(iii) one or more local spatial predictors utilizing pre-computed values.

Optionally, in the method, the at least one Delta encoding algorithm is implemented by:
(a) using a data processing arrangement for applying to the input data (DA1) a form of differential and/or sum encoding to generate one or more corresponding encoded sequences; and
(b) using the data processing arrangement to subject the one or more corresponding encoded sequences to a wrap around a maximum value and/or a wrap around a minimum value, for generating the encoded output data (DA2 or DA3) (=ODelta).

Optionally, it is also possible to use the ODelta method, see APPENDIX 1, in a following way. If the difference between a given original value and a corresponding predicted value is always zero or positive, or if the difference between the original value and the predicted value is zero or negative, with or without quantization being employed, then it is possible to express and deliver only the sign, namely sign bit, of the delta values together with coding method information. Thus, in such cases, wrapping will not be needed at all, because the values will always fit into the given bit count, even without wrapping.

Methods used in this way can be conveniently referred to as, for example, an IDelta ("Increment Delta") method and a DDelta ("Decrement Delta") method. The IDelta method thus delivers only positive delta values, and the DDelta method delivers only negative delta values, however often, beneficially, swapping the sign, namely the sign bit. Both methods described above of course always also deliver unchanged values together with a zero symbol/value, whether this unchangedness has been achieved with quantization or without quantization; namely, in such case, the difference between the values is not larger than the quantization used.

Moreover, optionally, it is also possible to use delta values together with a pedestal value. This means that if there were to occur both negative and positive delta values but their absolute values were small as regards the dynamic range and bit depth of the data being coded, then it would be sometimes beneficial to deliver the pedestal value of the change, namely the largest negative change, quantized or not. After that, it is possible to deliver only positive change values, just as in the aforementioned IDelta method. Such a pedestal method can be referred to, for example, as a "PDelta method". Often, when the PDelta method to is used, the dynamic range/bit depth of the data can be decreased more than when the original ODelta method as described in APPENDIX 1 is used. That is, the data can be expressed using less bits because the maximum value of the data will be smaller and therefore the difference between the smallest and the largest possible value will be smaller. This arises because the ODelta method must always express and deliver the dynamic range of the occurring values, namely the value range of the ODelta values to be delivered.

The IDelta, DDelta and PDelta methods described above are beneficial to use in such solutions where the prediction that is being used is, for example, a previous block, channel, image or some other set of values determined and declared before using these methods. Therefore, the difference between the value being coded and the prediction value is easy to be determined once and for all, and thus the prediction for the value or the difference are not dependent upon the other values being coded. These kinds of predicting solutions are also especially very well suited to be used with quantization, because, in these cases, the quantization of the difference values will influence only the one individual data value to be decoded, and thus the error caused by quantization cannot cumulate into other data values to be decoded.

Optionally, information about the used prediction or possibly used quantization is often delivered together with the method selection information. Beneficially, the information on quantization can often be delivered for an entire sequence of data in one go by using one quantization value or quality value. Examples of such methods are, for example, conveniently referred to as being IDeltaBlockFromChannel0, PDeltaChannelR_2, DDeltaFrame_4, ODeltaBlockMode and DDeltaPacketPrev. The first one of these methods, namely IDeltaBlockFromChannel0, delivers only positive difference values in relation to the channel 0 values in the corresponding block. That is, each data value in the data block currently being coded is larger than or at least equal to the value in the corresponding location in channel 0 of the block that is used as prediction.

The second one of these methods, namely PDeltaChannelR_2, delivers a to pedestal value followed by positive difference values, namely differences between the current channel and R channel, further quantized by two. The method DDeltaFrame_4 is well suited for a gradually darkening image, for example. It delivers negative value changes as compared with the previous frame, quantized by four. The method ODeltaBlockMode delivers for the current block area wrapped difference values, as compared with the mode value. Optionally, this mode value can be sent/delivered for each block separately, or as predicting mode value the mode value of the entire data channel or the mode value of the entire data frame can be used.

The DDeltaPacketPrev method delivers negative data values for the current packet, as compared with the previous packet that had a similar size.

Optionally, the method includes arranging for the encoder to employ at least one quantization algorithm when encoding the input data (D1) to generate the encoded data (E2), wherein the at least one quantization algorithm results in the encoder providing lossy encoding of the input data (D1).

Optionally, the method includes arranging for the encoder to employ different algorithms for encoding data of different data structures present in the input data (D1).

Optionally, the method includes arranging for the encoder (100) to employ RD optimization when encoding the input data (D1) block-by-block, packet-by-packet, channel-by-channel, view-by-view or frame-by-frame. More optionally, in the method, the RD optimization is computed within the encoder (100) to minimize a value V of an equation:

$$V = D + \lambda * R$$

wherein the distortion (D) is a sum of squares error (SE) between the input data (D1) and a representation of the input data (D1) encoded into the encoded data (E2) and decoded into the decoded data (D3), and wherein a rate (R) represents an amount of encoded data measured, for example, as bits.

Optionally, in the method, the at least one Delta encoding algorithm (ODelta, DDelta, Delta, PDelta) and/or the at least one entropy encoding algorithm is operable to employ at least one of: DC methods, slide methods, multilevel methods, DCT methods, line methods, scale methods, database methods, Range coding, Huffman coding, RLE coding, SRLE coding.

Optionally, the method includes arranging for the encoder (100) to encode the input data (D1) including data structures corresponding to at least one of: YUV channels, BGR channels. More optionally, the method includes arranging for the encoder (100) to encode data of the channels in an order Y, U, V or in an order G, B, R. The alpha channel, namely the transparency channel, can also be coded separately or together with the other channels. Correspondingly, the data being coded may be audio data, in which case the sound amplitude values, which may have, for example, bit depths 8, 16 or 24, can be coded separately, channel by channel, or many channels in one go. Therefore, whether the data being coded is audio, images, video, genome data, measurement results, text, binary or anything else, the bit depth of the data being coded can vary for one to 256 bits per data element, for example.

Optionally, the method includes arranging for the encoder to include such data in the encoded data (E2) which is indicative of one or more encoding algorithms employed by the encoder to encode the input data (D1) to generate the encoded data (E2).

According to a third aspect, there is provided a decoder for decoding encoded data (E2) to generate corresponding decoded data (D3), characterized in that the decoder is operable to perform an inversion of encoding algorithms implemented in an encoder pursuant to the first aspect.

Thus, there is provided a decoder for decoding encoded data (E2) to generate corresponding decoded data (D3), characterized in that the decoder is operable to process the encoded data (E2) by applying at least one entropy decoding algorithm thereto to generate processed data, and to use one or more predictors in combination with at least one Delta decoding algorithm (inverse ODelta, inverse DDelta, inverse Delta, inverse PDelta) to decode the processed data to generate the decoded data (D3),
wherein the processed data includes delta values that are expressed using a value range that is not increased as compared to a value range of original data from which the encoded data (E2) was generated,
wherein the one or more predictors include at least one of:
(i) one or more temporal predictors;
(ii) one or more local spatial predictors which are subject to quantization; and
(iii) one or more local spatial predictors utilizing pre-computed values.

With reference to pre-computed values, the values can be any values that can be determined before performing the process for the data, based on spatial location; namely; that is, they are not local spatial predictors as in ODelta encoding, as described in APPENDIX 1. Examples of such pre-computed values include a previous block on a left-hand-side or above in relation to a current data block to be encoded, a location of the same data block in some previous channel, view or frame, or internal motion prediction within a given data frame.

Optionally, the decoder is operable to receive information indicative of a method, and then proceeds to execute a prediction according to the method and computes values to be decoded according to various different methods; in other words information of the used method is received at the decoder; and based on that information, it can be known whether to use the pedestal method (PDelta), or whether only positive difference values will occur (IDelta or PDelta), or whether negative difference values will occur (DDelta), or whether a regular wrap and limit values are used to differentiate between those negative and positive values (ODelta).

Optionally, in operation, the decoder receives information indicative of a method, executes prediction according to the method and computes values to be decoded according to various different methods, namely information of the used method is received, and based on that information, it can be known whether to use the pedestal method (PDelta), or whether only positive difference values will occur (IDelta or PDelta), or whether negative difference values will occur (DDelta), or whether a regular wrap and limit values are used to differentiate between those negative and positive values (ODelta). The prediction can be determined once and for all, or it can be determined as the process proceeds, as in ODelta (see APPENDIX 1). The original ODelta-type procedure which determines the prediction during the process is referred to as "local spatial prediction", also as "local prediction", and this new prediction solution, where the prediction for a block is determined beforehand once and for all, is referred to as "temporal prediction" or "spatial prediction". In addition to the blocks, channels, views and frames mentioned above, motion estimation is also considered "temporal prediction".

According to a fourth aspect, there is provided a method of decoding encoded data (E2) in a decoder to generate corresponding data (D3), characterized in that the method of decoding includes executing in the decoder an inverse of a method pursuant to the second aspect.

The method of decoding encoded data (E2) in a decoder (120) to generate corresponding data (D3), is characterized in that the method of decoding includes processing the encoded data (E2) by applying at least one entropy decoding algorithm thereto to generate processed data, and using one or more predictors in combination with at least one Delta decoding algorithm (=inverse ODelta, inverse DDelta, inverse Delta, inverse PDelta) to decode the processed data to generate the decoded data (D3), wherein the processed data includes delta values that are expressed using a value range that is not increased as compared to a value range of original data from which the encoded data (E2) was generated,
wherein the one or more predictors include at least one of:
(i) one or more temporal predictors;
(ii) one or more local spatial predictors which are subject to quantization; and
(iii) one or more local spatial predictors utilizing pre-computed values.

Pre-computed values are elucidated in the foregoing, likewise local predictors.

According to a fifth aspect, there is provided a computer program product comprising a non-transitory computer-readable storage medium having computer-readable instructions stored thereon, the computer-readable instructions being executable by a computerized device comprising processing hardware to execute a method pursuant to the second aspect or fourth aspect.

It will be appreciated that features of the invention are susceptible to being combined in various combinations without departing from the scope of the invention as defined by the appended claims.

DESCRIPTION OF THE DIAGRAMS

Embodiments of the present disclosure will now be described, by way of example only, with reference to the following diagrams wherein:

FIG. 4 is a schematic illustration of neighbourhood data values for prediction purposes, pursuant to an embodiment of the present disclosure;

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

When describing embodiments of the present disclosure in the following, abbreviations are employed as provided in Table 1:

TABLE 1 details of acronyms employed to describe embodiments

| Acronym | Detail |
|---|---|
| 1D | 1-Dimensional, for example referring to a signal or data packet |
| 2D | 2-Dimensional, for example referring to a signal or data packet |
| 3D | 3-Dimensional, for example referring to a signal or data packet |
| Block | Multiple data elements from digital data, namely a part of digital data |
| CRC | Cyclic redundancy check |
| Codec | Encoder and decoder for digital data |
| DB | Database in RAM-based or ROM-based memory |
| DC | DC-component of an image, namely an image mean, corresponding to an average brightness and represents a lowest spatial frequency present in the image |
| Delta Coding | Delta coding is a way of storing or transmitting data in a form of differences between sequential data rather than complete data files |
| ISP | Internal Switch Provider |
| LAN | Local Area Network |
| Packet | A body of data including, for example, a plurality of data blocks |
| RAM | Random Access Memory |
| RD | Rate-Distortion |
| RLE | Run-Length Encoding |
| ROI | Region of Interest |
| ROM | Read Only Memory |
| SRLE | Split Run-Length Encoding |
| VLC | Variable-Length Code |
| XOR | Exclusive Or (logic function) |

In overview, embodiments of the present disclosure are concerned with an enhanced form of encoder and decoder, and associated enhanced methods of encoding and decoding data. Embodiments of the present disclosure are based upon Delta encoding methods, such as an ODelta encoding method for example, which will be described in greater detail below, which has been further enhanced in embodiments of the present disclosure. Delta coding methods are provided for purposes of coding audio packets, image blocks, internet data packets, channels, video frames and so forth, by using various mutually different spatial and temporal prediction methods, and optionally a quantizer is employed. Encoding methods of the present disclosure are suitable for both lossless and lossy coding, and they comprise three main functional elements:

(i) prediction;
(ii) ODelta, or similar such as PDelta, IDelta or DDelta, operator with optional quantizer; and
(iii) entropy encoding.

Figure 5:
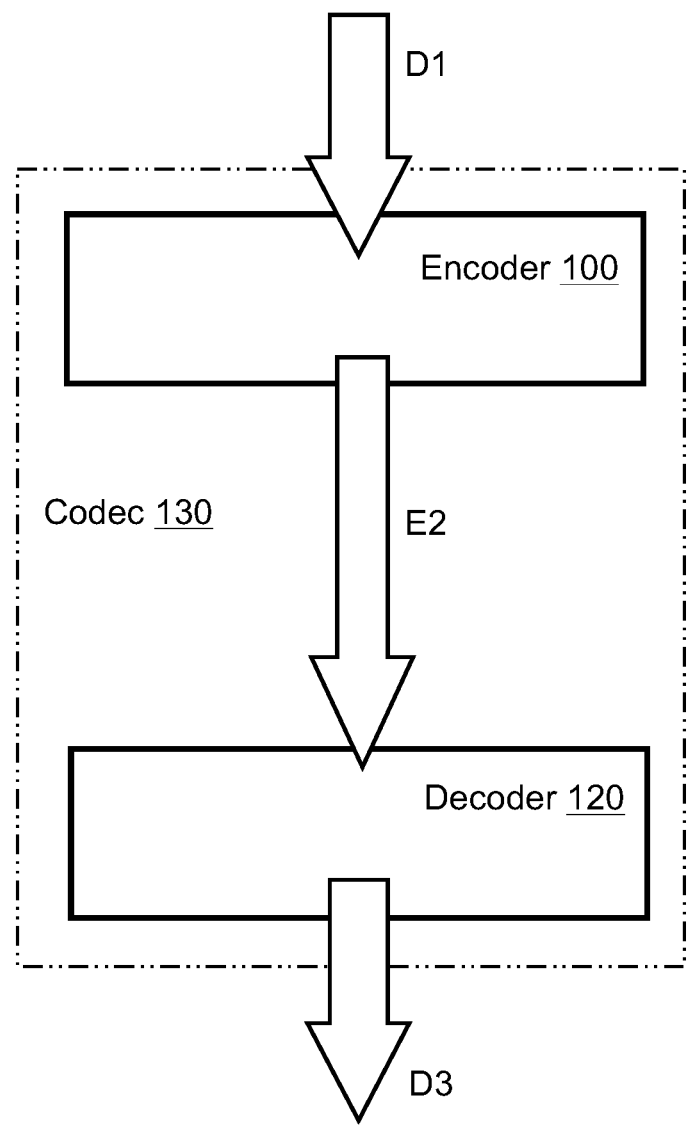
FIG. 5 is a schematic illustration of an encoder, a decoder and codec pursuant to the present disclosure.

The encoding methods of the present disclosure, and corresponding decoding methods, are susceptible to being used in encoders and decoders respectively, as will be described in greater detail later with reference to FIG. 5.

In the appended APPENDIX 1, there is provided a description of an ODelta operator for DPCM style of usage. In the present disclosure, in text prior to the APPENDIX 1, those ODelta operators are modified to use different (local) spatial, temporal or combinatory prediction methods. The methods of the present disclosure are devised so that they can be used for an entire data sequence, for individual data frames, for individual data channels, for individual data blocks or for individual data packets, and so forth. Moreover, methods of the present disclosure provide several mutually different coding methods based on selected prediction methods, selected ODelta operators, and selected residual coding and compression methods.

Many other coding methods are optionally used in conjunction with methods of the present disclosure, and these such methods are advantageously used with block encoder as described in APPENDIX 2 which is described in a patent document GB2503295 which is hereby incorporated by reference, and a block decoder as described in APPENDIX 3 which is described in a patent document GB2505169 which is hereby incorporated by reference. The selection of a best coding method to employ to encode a given data block is, for example, made by using RD-optimization, when, for example, a given data channel is to be coded block-by-block. The RD-optimization minimizes a value V of an equation, namely:

$$V = D + \lambda * R \qquad \text{Eq. 1}$$

wherein the distortion (D), typically, is a sum of squares error (SE) between original and decoded values, and wherein the rate (R) of encoded data values is typically measured by bits. With the methods pursuant to the present disclosure, many other coding methods are also optionally used, for example DC methods, slide methods, multilevel methods, DCT methods, line methods, scale methods and database methods and so forth.

The methods pursuant to the present disclosure are beneficially used for mutually different data structures present in input data (D1) to be encoded. For example, an entire data channel, for example a luminance channel of a planar image, is optionally coded with the methods pursuant to the present disclosure. The methods pursuant to the present disclosure are simple and are susceptible to being implemented with low complexity in devices and systems, for example using reduced instruction set (RISC) processors which are contemporarily employed in low-power portable electronic devices such as mobile telephones, cameras, and similar. Therefore, the results provided by the methods of the present disclosure for the entire channel can easily be compared against other channel coding methods, for example black/ mode value channel, freeze channel, entropy coded original channel, and channel coding with block encoder. The selection of the best channel coding method is also beneficially made with RD optimization. A channel coding with a block encoder method means that the data channel is coded block-by-block with mutually different coding methods and in this case, one coding method is not used for the whole data channel.

The methods of the present disclosure are optionally susceptible to being used in lossy coding, namely with quantized residual value coding or without residual coding, or in lossless coding, namely with zero residual or non-quantized residual value coding. All the earlier coded and decoded values in an encoder and in a decoder, pursuant to the present disclosure, can be used for prediction of current or future data values. When data is coded losslessly by applying encoding methods of present disclosure thereto, then also the already processed source values, which are the same as decoded values in lossless coding, can be used for prediction of current or future data values in the encoder.

The most important parameters of the ODelta operator are highValue, lowValue and wrapValue (namely, at least high-Value−lowValue+1); this is elucidated in greater detail in APPENDIX 1. It is also possible that the highValue and lowValue are defined to utilize quantization. For example, the original data contains values from 0 to 255, but it is desired that the end result be quantized to values, for example from 0 to 78 (relative quantization 78/255) with a selected quality factor (for example, 30, in a case when the values of the quality values range from 'one' to 'one hundred', where the quality value 'one hundred' refers to lossless compression.). Data offsets can also be used before (pre-offset) or after (post-offset) utilizing an ODelta operator. Moreover, entropy encoding is beneficially executed after the ODelta operator, because otherwise the reduced entropy would not be fully utilized in the data encoding.

Referring to the aforementioned IDelta, DDelta and PDelta methods, the wrapValue does no longer need to be determined, as was needed in the ODelta method, as described in APPENDIX 1. Therefore, as regards the aforementioned IDelta, DDelta and PDelta methods, the –highValue' and lowValue' play an even more important role, along with the method selection information and the eventual quantization information. In these cases, highValue' and lowValue' no longer refer to a value range of final actual data values but instead they refer to the value range of the difference values being delivered. The lowValue' can also be used to determine the pedestal value of the PDelta method, in which case the maximal data value being delivered is the result of high Value'−lowValue' as such, or possibly limited by quantization. This quantization can be determined either by a divisor, by a quality parameter or as a relative change in relation to the original dynamic range. An example of such an implementation is provided in the foregoing where the original highValue or the highest difference highValue' was 255 and the value range was limited and decreased by a relative quantization value 78/255. The quantization value of relative quantization can in this example be delivered, for example, as a value 78 or else as value a 0.3059 (namely less than 78/255).

The entropy encoding method used is beneficially selected to be Range coding or SRLE Range coding, but other entropy encoding methods can also be used, for example Huffman coding, RLE coding, SRLE coding. When the ODelta method described in APPENDIX 1 is used, then the prediction value is preferably always the previous data value and the first prediction value needs to be initialized by selected initialization method.

In methods pursuant to the present disclosure, the prediction values can be selected differently to using only the previous data value. Pursuant to methods of the present disclosure, it is possible to use a prediction value that is one selected data value or a value calculated from multiple data values. For example, the value can be calculated from two or more previous data values (1D), from two or more previous data values in the neighborhood (2D, 3D, . . . ), from data value/values in the previous data block or data packet, from data value/values in the previous data channel/channels, from data value/values in the previous data frame/frames, from any combination of previously mentioned data values, and so forth.

When a prediction value for the current data value is calculated, then the difference, or the sum, between the original and predicted data value is calculated as the OValue. The OValue can be quantized, or copied, to QOValue, and then it can be given to the ODelta operator that makes a wrap around (namely by addition and/or subtraction of wrapValue), if the QOValue is lower than the lowValue or higher than the highValue.

It will be appreciated that, especially when the value is quantized, the quantization levels have to be designed so that a wrap around and inverse wrap around can be executed accurately, so that the wrapping operation does not change the result of the method from positive addition (or subtraction) to negative addition (or subtraction), or vice versa. The wrap around should neither change the result to a clearly smaller absolute value, or to a clearly bigger absolute value. This means that, if for example two different quantizers are used for absolute data values, then the small and the big data values have to be quantized with a smaller quantizer value than the middle data values, so as to avoid a wrong interpretation of data value in inverse quantization and wrap around.

Figure 1:
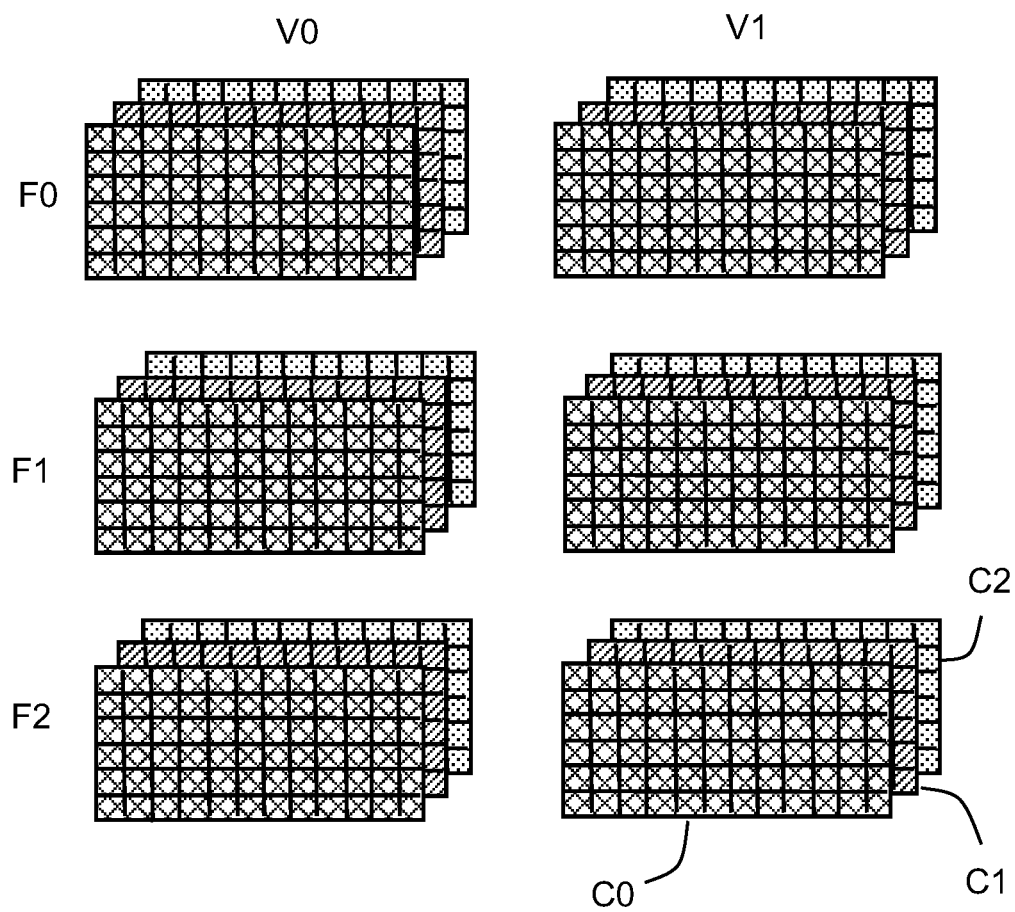
FIG. 1 is a schematic illustration of an example upper-level structure of an embodiment of the present disclosure.

Referring next to FIG. 1, there is shown schematically a manner in which 3D video content is split into different data structures, such as frames, views, channels, data blocks, data packets and individual data values. It is also optionally possible to use additional structures, for example a group of frames, a group of data blocks, init data blocks, and data slices. All such mutually different structures do not need to be separate during processing and encoding of input data (D1) to generate corresponding encoded data (E2), pursuant to the present disclosure. The order of data can vary, but in the example in FIG. 1, the blocks in a given channel are processed from left-to right and from top-to-bottom. All the values that are already processed, namely encoded, and optionally decoded when implementing lossy coding, can also be used for prediction of current and future values, because then an encoder and a corresponding decoder pursuant to the present disclosure can both have information regarding the values decoded from the encoded values.

Pursuant to the present disclosure, it is often beneficial to encode YUV channels in an order Y, U, V, and also BGR channels in an order G, R, B or G, B, R to enable better alternatives for temporal channel prediction in methods pursuant to the present disclosure. Temporal channel prediction is typically a very good method when a given image is encoded into the RGB color space. Temporal channel prediction reduces channel correlation considerably. When the YUV color space is used, then the channel correlation is highly reduced already because of the properties of that color space. Moreover, when the YUV color space is used, then the Y channel contains most of the information, which means that the U and V channels can be coded more efficiently.

The methods of the present disclosure optionally have separate sub-methods, namely algorithms, available for processing mutually different data structures. For example, a color channel can be coded with spatial prediction or temporal prediction. Different types of temporal prediction sub-methods can also be used. One sub-method, for example, uses a same channel value in a similar position as in a previous frame, whereas another sub-method uses the same channel value in a similar position in the previous view, and yet another sub-method uses the similar position value from, for example, channel 0 to predict the value for, for example, channel 2.

When temporal prediction is used, there is no need to define any first prediction value, because every value in the current channel has a prediction value available in the other frames, views or channels. "Temporal kind of prediction" can also be used for similar data blocks located spatially earlier in a given channel. Typically, when this kind of method is used, there are only a couple of data block alternatives available, such that the amount of different sub-methods is not increased excessively. This also means that there is no need to transmit a "motion vector" kind of block descriptor. This kind of data block descriptor can also be optionally used, but typically the accuracy of a descriptor is, for example, data blocks and not individual data values, so the amount of different combinations can be highly reduced compared to employing intra-motion vector estimation.

Even if there were to be used a combination of alternative available algorithms with a similar accuracy to which a typical known intra/inter motion estimation method would yield, there would still be a big benefit in employing methods pursuant to the present disclosure, because selections made by methods of the present disclosure contain also efficient residual coding by employing ODelta encoding. Thus, in methods pursuant to the present disclosure, there is no need to use separate intra/inter motion estimation for prediction and then separately, for example a DCT method for residual coding.

In embodiments of the present disclosure, spatial prediction optionally uses mutually different prediction values. A previous value prediction (A for X) is known technology from ODelta techniques; see APPENDIX 1. One beneficial method to employ in embodiments of the present invention uses prediction value such as P=A+B−C for value X. Many other prediction values are also optionally used, for example 2A-D or PAETH prediction described in PNG documentation. The prediction value is beneficially restricted, or otherwise truncated, to a range of possible values. For example, if a given value in a channel 0 is potentially provided with values between 0 (lowValue) and 63 (highValue) and A=60, B=61, C=52, then P=A+B−C=69, which is clipped, truncated or saturated to a value 63 (=highValue).

If X=62, then OValue, with modified ODelta operator method 1, is 62−63=−1. This value does not need to be quantized, in lossless coding, and so QOValue is also −1. Now, it will be appreciated that −1 is smaller than lowValue (0) and, then, wrapValue (64) needs to be added to QOValue to get 63 as the ODelta value. This value is set to a buffer for entropy encoding purposes for encoding the value X with this ChannelSpatialODeltaCoded method. Similar processing is performed also for the other data values, and when all the channel values are processed, whereafter the contents of the buffer of ODelta values are compressed with, for example, range coding, or serial run-length encoding (SRLE) range coding, to create the output encoded data values for the channel 0.

It will be appreciated that, when the first row is processed, there is only a value A available for prediction, when using A+B−C as a prediction value, so the value A is directly used as a prediction value. Similarly, for the first column, only a B value is available, so the value B is used as a prediction value. The first value, for example an uppermost, left-most value in the channel 0 does not have any spatial value that can be used for prediction. It is possible to use temporal values for the first prediction value, namely if it is available in the previous view or in the previous frame for example. If there is no suitable temporal prediction value available, then, for example a value 0 or a midrange value ((63−0+1) div 2=32, or a separately delivered mode value of channel/view/frame, can be used as the first prediction value for channel 0. It is also possible to use different predictors with a method and even deliver information about which predictor is used for which frame, channel, block or even data value in the encoded data (E2).

Similar methods can also be used for, for example, data blocks. The example below illustrates how a block 2 in a channel 2 is coded using a BlockChannel0ODeltaCoded method that allows quantization by value 4 to be used for corresponding encoded values, with clearly smaller quality requirements. This quantization by value 4 means that lowValue is 0, highValue is 15 and wrapValue is 16. Now, the block 2 in the current channel 2 contains values as follows, for example:

45, 48, 50, 52
46, 48, 50, 51
46, 49, 49, 50

The block 2 in channel 0 contains the following prediction values:

36, 39, 40, 42
36, 37, 39, 41
36, 39, 39, 41

On account of temporal prediction being used, the quantization of encoded values, that modifies the decoded values of channel 2, does not affect the prediction values in channel 0, and so the process can be simplified by not taking the quantization into account when OValues are defined. The OValues are then as follows:

9, 9, 10, 10, 10, 11, 11, 10, 10, 10, 10, 9

When the values are quantized by dividing them with value 4, then there are thereby generated QOValues as follows:

2, 2, 2, 2, 2, 2, 2, 2, 2, 2, 2, 2

On account of all the values being inside the range, namely 0 to 15, a wrap around is not needed for any QOvalues, and ODelta values are then the same as QOValues. Now, it will also be appreciated that all the ODelta values are the same and, then it is feasible to change the used coding method from BlockChannel0ODeltaCoded method to BlockChannel0ODeltaSame method or to BlockChannel0IDeltaSame method. This BlockChannel0ODeltaSame method requires that only one value (2) is delivered with it, which enables decoding of block values properly in a decoder, namely in a similar manner as done also in an encoder.

For that data block, the decoder is then issued to employ the encoding method BlockChannel0ODeltaSame and the value 2. Then, it creates a buffer that contains 12 (4×3 block) values as follows:

2, 2, 2, 2, 2, 2, 2, 2, 2, 2, 2, 2

In this example, de-quantization multiplies the values by 4, and optionally adds 1 to enable better estimation of error inside the quantized range. When these values are de-quantized, there are thereby generated values such as:

9, 9, 9, 9, 9, 9, 9, 9, 9, 9, 9, 9

When these de-quantized values are added to prediction values, that are similar to those in the encoder from channel 0, the block values are as follows:

45, 48, 49, 51
45, 46, 48, 50
45, 48, 48, 50

The distortion, namely errors between given original data and corresponding decoded after an encoding-decoding process, of values during encoding and decoding will be as:

0, 0, 1, 1
1, 2, 2, 1
1, 1, 1, 0

That distortion is caused by quantization and is quite small. The method is very efficient, because only the selected method and one value are required to be delivered for a whole given 4×3 data block. If more blocks are to be coded with the same, or substantially similar, encoding method in the channel, then all those values can be, for example, range-encoded in a given encoder and range-decoded in a corresponding given decoder to enable an even higher compression ratio, namely a ratio of: an amount of the original or decoded data (D1)/amount of the encoded data (E2)).

When using the aforementioned ODelta, optionally, channel 2 is encoded before channel 0, and then channel 0 beneficially uses channel 2 for prediction. In this case, all the QOValues are beneficially −2. Those values are lower than lowValue, and therefore a wrap around (namely by addition of wrapValue) is needed, and then all ODelta values are equal to 14 (−2+16). Thus, aforementioned ODelta coding employed for implementing embodiments of the present disclosure does not increase the range or does not need any sign bit, and for that reason, it is more efficient than a similar known Delta coding method. ODelta coding is also more efficient than utilization of a DC method for the difference channel for this current data block.

Next, an example will be described that encodes spatially a 4×3 block with BlockSpatialODeltaCoded in channel 1. In this example case, this method uses 0 as a first prediction value. The original values are in the range from 0 to 255, and the quality is set so that the lowValue is 0, highValue is 35 and wrapValue is 36 in the encoder. Of course, in a corresponding decoding phase, the values beneficially still stay in the original range from 0 to 255, and thus in the decoding phase, the lowValue is 0, highValue is 255 and wrapValue is 256. The original block is then as follows:

141, 151, 148, 137
159, 150, 152, 147
159, 154, 153, 150

The quantizer for the first 16 levels, namely for levels 0 to 15, and last 16 levels, namely levels 20 to 35, is 7; for the middle 4 levels, namely levels 16 to 19, the quantizer is 8. This means that all absolute difference values below 112, namely 0 to 111, are quantized, namely divided, by a value 7. The next values until 144, namely 112 to 143, are subtracted by a value 112, quantized by a value 8, and added by a value 16. The last values, namely 144 to 255, are subtracted by a value 144, quantized by a value 7, and added by a value 20. Similarly, the de-quantization for the first 16 values, namely values 0 to 15, is performed by multiplying each value by a value 7. The middle values from 16 to 19 are decoded by subtracting each value a value 16 therefrom, thereafter then multiplying each value by 8 and then adding a value 112 to each value. The last values, namely values 20 to 25, are decoded by subtracting a value 20 from each value, then multiplying them by a value 7 and then adding a value 144 to them.

The first value is 141. The prediction value was initialized as 0, and so the OValue is 141, and the QOValue is then 19. There is no need for a wrap around, and the ODelta value is then also 19. This value is decoded back to the value 136 (16*7+3*8) without a wrap around, and that value is optionally beneficially used for future predictions.

The second value is 151, the prediction value based on A is optionally used and it is 136. The OValue is 15, and the QOValue is 2. Again, there is no need for a wrap around, and the ODelta value is 2. This value is decoded back to value 150 (136+2*7) without employing a wrap around, and it is optionally beneficially also used for future predictions.

The third value is 148, and the prediction value based on A is now 150. The OValue is −2, the QOValue is 0. Again, there is no need for a wrap around, although the OValue is negative, but the quantized value QOValue is 0, and it is inside the range and thus ODelta value is also 0. This value is decoded back to value 150 (150+0) without a wrap around being employed, and that value is also optionally beneficially used for future predictions.

The fourth value is 137, the prediction value based on A is again 150. OValue is −13. QOValue is −1. Now a wrap around is needed and the ODelta value is −1+36=35. When this value is decoded back, the value 150+249 is higher than highValue, namely a value 255, and so a wrap around is needed and the result is then 150+249−256=143, which is optionally beneficially used for future predictions.

The fifth value is in the new row and it is 159. The prediction can now be executed by using the value B which is 136. The OValue is 23, the QOValue is 3. There is no need for a wrap around, and the corresponding ODelta value is thus also 3. The decoded value is now 136+21=157, and it is also optionally beneficially used for future predictions.

The sixth value is 150, and it can use A+B−C as a prediction value. The prediction value is now 157+150−136=171. The OValue is −21, and the QOValue is −3. A wrap around is needed, and the ODelta value is thus 33. The decoded value needs also to be subject to a wrap around, and then the result is 150 (171+235−256), which is also optionally beneficially also used for future predictions.

Processing is beneficially continued in a similar manner to an end of the given data block, and the overall ODelta-coded result is then as follows:

19, 2, 0, 35, 3, 33, 0, 0, 0, 0, 0, 1

These values are beneficially inserted into a buffer and entropy-encoded using, for example, SRLE range coding, together with other similarly encoded ODelta values. The decoder is provided with information in the encoded data (E2) regarding the method BlockSpatialODeltaCoded and the encoded ODelta values, and the decoder is then able to reproduce the values as:

136, 150, 150, 143
157, 150, 150, 143
157, 150, 150, 150

The distortion, namely an error between the original data (D1) and the decoded (D3), wherein encoding and decoding used are mutually inverse, of values after encoding and decoding is:

5, 1, −2, −6
2, 0, 2, 4
2, 4, 3, 0

It will be appreciated that the first value can be potentially any value, and a good initialization estimate is beneficially employ easily to improve the result. It is also possible to deliver these first values separately and improve the encoding result of other values. The other values typically contain a lot of zeroes, and also a few values close to 1, corresponding to +1, and close to 35, corresponding to −1; in this example, the highValue was 35 and the wrapValue was 36.

Sometimes, all the coded values are zeroes, and in such a case, for example the BlockSpatialODeltaNotCoded method is beneficially used that performs only spatial prediction, but does not deliver any value for ODelta coding. Typically, spatial prediction needs coded values, but temporal prediction is often also operated with a constant value, namely "Same", or without coding values, namely "NotCoded", instead of the all coded values, namely "Coded" method.

When methods pursuant to the present disclosure are used, they are typically used as mutually different methods. It is also possible to use some base method and then employ the sub-method describing, for example, a given used temporal prediction source, coding solution and so forth. In a next example, Table 2 provides a list of mutually different channel and block coding sub-methods. Each sub-method is expressed, namely defined, with associated 3 bits.

TABLE 2

Channel and Block Coding methods

| Method | Base method | Sub-method |
| --- | --- | --- |
| Channel_Channel0ODeltaCoded | ChannelODelta | 000 |
| Channel_Channel1ODeltaCoded | ChannelODelta | 001 |
| Channel_ViewPreviousChannel0ODeltaCoded | ChannelODelta | 010 |
| Channel_ViewPreviousChannel1ODeltaCoded | ChannelODelta | 011 |
| Channel_ViewPreviousChannel2ODeltaCoded | ChannelODelta | 100 |
| Channel_FramePreviousODeltaCoded | ChannelODelta | 101 |
| Channel_ChannelPreviousODeltaNotCoded | ChannelODelta | 110 |
| Channel_SpatialODeltaCoded | ChannelODelta | 111 |
| Block_Channel0ODeltaCoded | BlockODelta | 000 |
| Block_Channel1ODeltaCoded | BlockODelta | 001 |
| Block_Channel0ODeltaSame | BlockODelta | 010 |
| Block_Channel0ODeltaNotCoded | BlockODelta | 011 |
| Block_FramePreviousODeltaCoded | BlockODelta | 100 |
| Block_BlockLeftODeltaCoded | BlockODelta | 101 |
| Block_BlockUpODeltaCoded | BlockODelta | 110 |
| Block_SpatialODeltaCoded | BlockODelta | 111 |

Different channels are optionally coded by using mutually different coding methods. For example, a given first channel (channel 0) is coded with a block encoder, that optionally also uses BlockODelta methods for encoding data blocks, a given second channel (channel 1) is coded with Channel_Channel0ODeltaCoded temporal prediction based ODelta method, and a given third channel (channel 2) is coded with a Channel_SpatialODeltaCoded spatial prediction based ODelta method. If all the channels are coded with the same method, for example with the spatial prediction based ODelta method, then for example the Frame_SpatialODeltaCoded method is beneficially delivered for a corresponding frame, and no other coding method needs to be delivered for that frame, namely no channel coding methods or block coding methods are required to be used.

Figure 2:
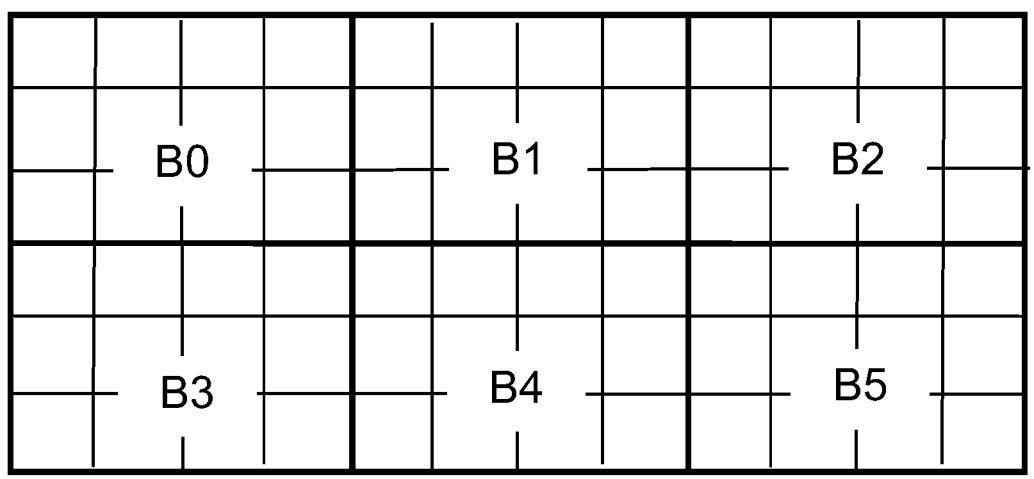
FIG. 2 is a schematic illustration of an example channel of six blocks of an embodiment of the present disclosure.
Figure 3:
FIG. 3 is a schematic illustration of an example block and its associated composition.

Data structures which are pertinent to embodiments of the present disclosure will next be described with reference to FIG. 1 to FIG. 4. There are shown data structures and data values that can be used for spatial prediction in methods of the present disclosure. In FIG. 1, there is shown an example of an upper-level structure, whose data consists of, for example, three frames, wherein each frame has, for example, two views, and each view has, for example, three channels. Optionally, the data of the upper-level structure includes slices, groups of data blocks, or other data structures. Optionally, some structures are missing, for example packets and/or views. The prediction of data values potentially changes considerably, due to different structures being present or due to a choice of the processing order of values or structures being employed. In FIG. 2, there is shown an example channel of six blocks. An order of the blocks, for encoding purposes is from Left-to-Right and Top-Down. In FIG. 2, block comprises, for example, three packets, wherein each packet has, for example, 4 values. Moreover, in FIG. 3, there is shown an example block and its constituent elements.

Figure 4:
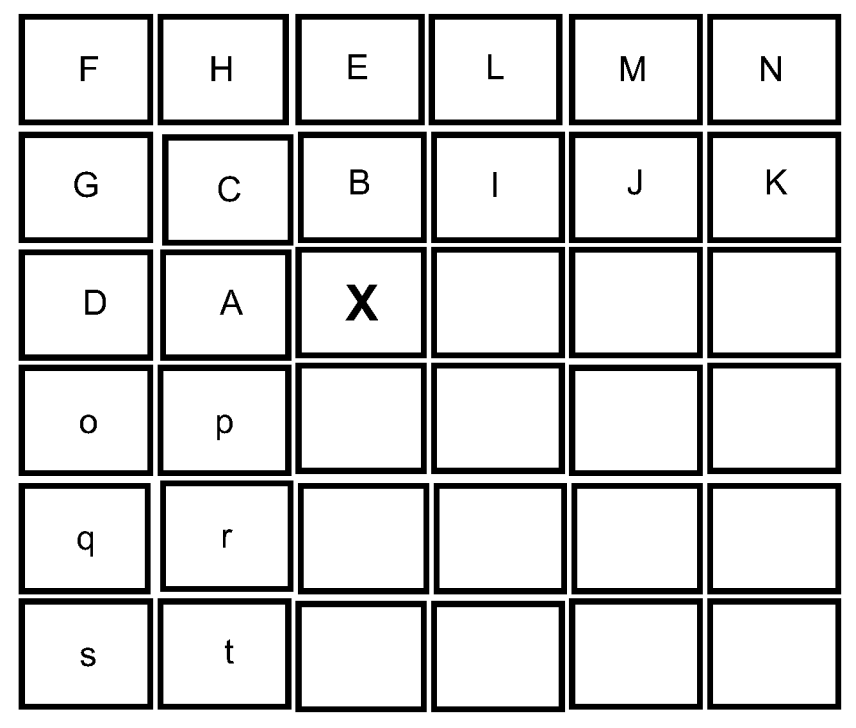

Therefore, an overall example data is then: −>Data= 3*2*3*6*3*4 Values=1296 Values. A next example presents neighborhood data values that are used for prediction. In FIG. 4, values A to N are previous data values for a position X. The values 'o' to 't' are, for example, previous data values, if they are in one or more other blocks that are processed earlier than a given current block. The previous data packets, data blocks, channels, views and frames also potentially contain data values that are useable for prediction purposes. Thus, FIG. 4 is a schematic illustration of neighborhood (English: "neighbourhood") data values that are potentially useable for performing prediction, pursuant to the present disclosure.

Embodiments of the present disclosure described in the foregoing provide methods which are capable of improving data compression results by utilizing a modified version of the ODelta operator, as aforementioned. The methods of the present disclosure employ potentially many mutually different prediction method alternatives and an optional quantizer that operates properly with ODelta wrapping. The methods of the present disclosure also employ entropy encoding to utilize all the benefits yielded by ODelta-operated entropy reductions. The methods are suitable for various mutually different kinds of data structures, for example frames, channels, data blocks and data packets. There are employed well defined coding methods for each structure, which creates a small amount of corresponding ODelta coded data. Savings in data communication bandwidth required to store and to communicate the encoded data relative to that required for corresponding un-encoded data are potentially considerable and highly beneficial.

Aforementioned methods and embodiments are beneficially implemented in respect of data encoders and data decoders. Referring to FIG. 5, embodiments of the present disclosure concern:

(i) an encoder 100 for encoding input data D1 to generate corresponding encoded data E2, and corresponding methods, as aforementioned of encoding the input data D1 to generate the encoded data E2;

(ii) a decoder 120 for decoding the encoded data E2 to generate corresponding decoded data D3. Optionally, the decoded data D3 is exactly similar to the input data D1, as in lossless encoding, or the decoded data D3 is approximately similar to the input data D1, as in lossy decoding, or the data D3 is different to the input data D1, for example by way of a transformation, but retains substantially information present in the input data D1, and corresponding methods of decoding the encoded data E2 to generate the decoded data D3;

(iii) a codec 130 including a combination of at least one encoder 100 and at least one decoder 120, wherein the codec 130 is optionally implemented within a single device or is effectively implemented between multiple devices; for example the codec 130 is optionally implemented as a broadcast system wherein there is an encoder

100 at a first spatial location and a plurality of decoders 120 at a plurality of other spatial locations.

Modifications to embodiments of the invention described in the foregoing are possible without departing from the scope of the invention as defined by the accompanying claims. Expressions such as "including", "comprising", to "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

Appendix 1: Overview of ODelta Encoding

An overview of ODelta encoding is provided below. There is provided for ODelta encoding and associated technology, including an encoder 1010, a method of using the encoder 1010, a decoder 1020, and a method of using the decoder 1020.

The encoder 1010, for encoding input data (DA1) including a sequence of numerical values to generate corresponding encoded output data (DA2 or DA3), is characterized in that the encoder 1010 includes a data processing arrangement for applying to the input data (DA1) a form of differential and/or sum encoding to generate one or more corresponding encoded sequences, wherein the one or more corresponding encoded sequences are subjected to a wrap around a maximum value and/or a wrap around a minimum value, for generating the encoded output data (DA2 or DA3).

The method of using an encoder 1010, for encoding input data (DA1) including a sequence of numerical values to generate corresponding encoded output data (DA2 or DA3), is characterized in that the method includes:
(a) using a data processing arrangement of the encoder 1010 for applying to the input data (DA1) a form of differential and/or sum encoding to generate one or more corresponding encoded sequences; and
(b) using the data processing arrangement to subject the one or more corresponding encoded sequences to a wrap around a maximum value and/or a wrap around a minimum value, for generating the encoded output data (DA2 or DA3).

The decoder 1020, for decoding encoded data (DA2, DA3 or DA4) to generate corresponding decoded output data (DA5), is characterized in that the decoder 1020 includes a data processing arrangement for offset processing one or more portions of the encoded data (DA2, DA3 or DA4), wherein the data processing arrangement is operable to apply a form of differential and/or sum decoding to one or more corresponding encoded sequences of the one or more portions, wherein the one or more encoded sequences are subjected to a wrap around a maximum value and/or a wrap around a minimum value, for generating the decoded output data (DA5).

The method of using a decoder 1020, for decoding encoded data (DA2, DA3 or DA4) to generate corresponding decoded output data (DA5), is characterized in that the method includes:
using a data processing arrangement for processing one or more portions of the encoded data (D2, D3 or D4), wherein the data processing arrangement is operable to apply a form of differential and/or sum decoding to one or more corresponding encoded sequences of the one or more portions, wherein the one or more encoded sequences are subjected to a wrap around a maximum value and/or a wrap around a minimum value, for generating the decoded output data (D5).

The method of using a decoder 1020, for decoding encoded data (DA2, DA3 or DA4) to generate corresponding decoded output data (DA5), is characterized in that the method includes:
(a) using a data processing arrangement for processing the encoded data (DA2, DA3 or DA4) for applying decoding to one or more portions of the encoded data (DA2, DA3 or DA4), taking into account that the encoded data (DA2, DA3 or DA4) includes at least one encoded sequence representing changes in sequential values of translated data, and employs a wrap around a maximum value or a wrap around a minimum value; and
(b) using the data processing arrangement to generate corresponding processed data, and to translate the one or more portions using the at least one pre- and/or post-offset value to generate the decoded output data (DA5).

Figure 6:
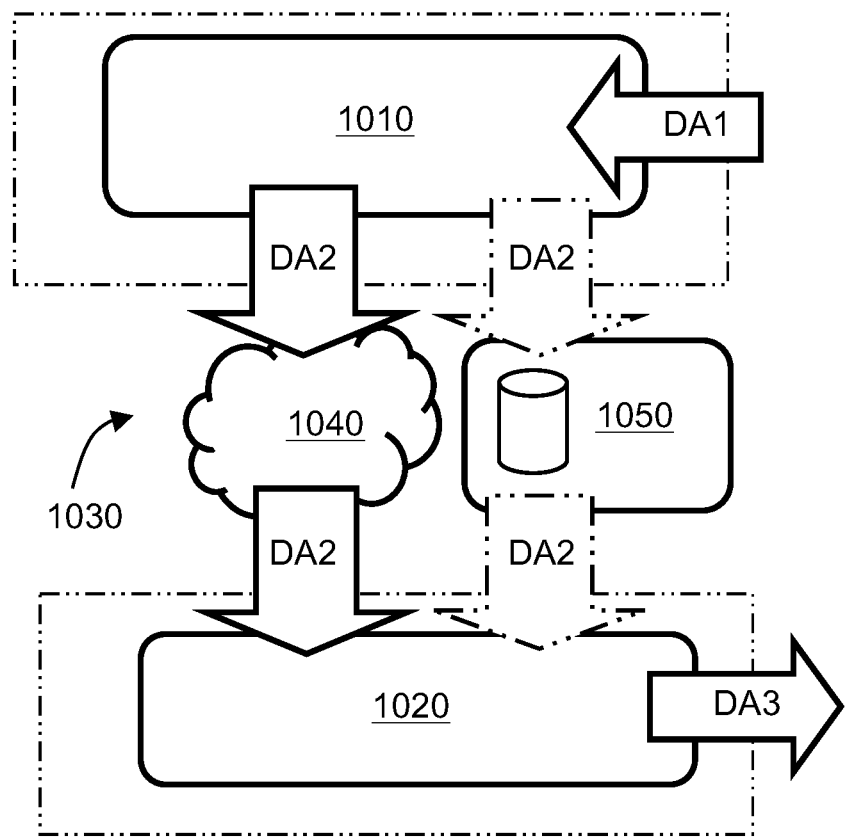
FIGS. 6 to 8 relate to supporting disclosure in APPENDIX 1 regarding ODelta methods.
Figure 7:
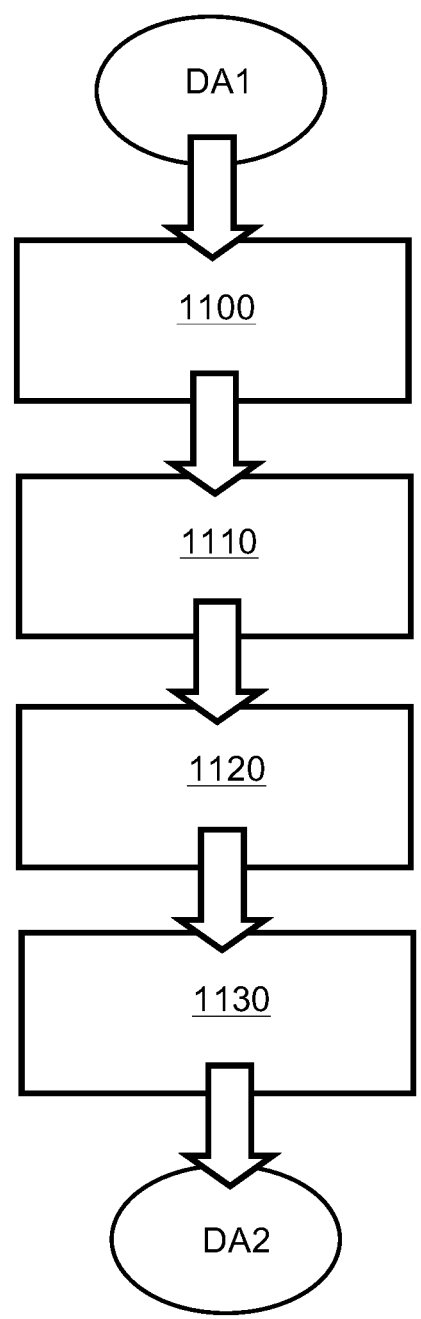
Figure 8:
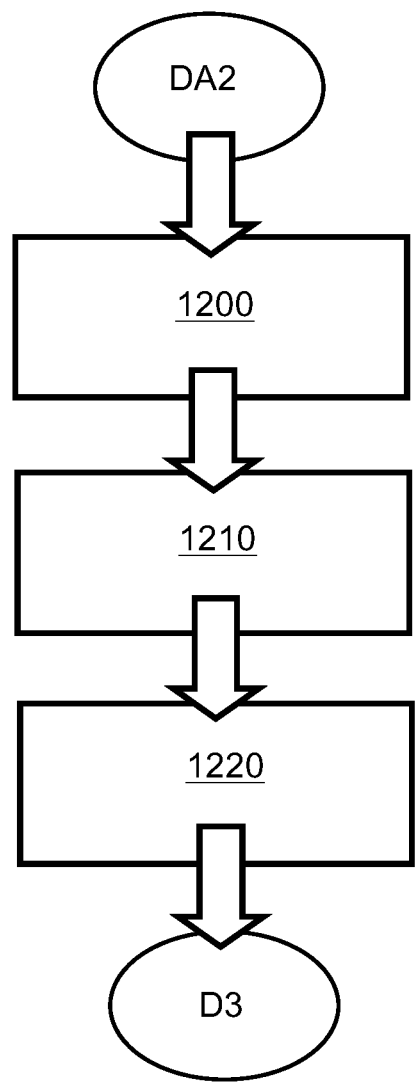

Embodiments of the present disclosure for APPENDIX 1 will now be described, by way of example only, with reference to the following diagrams wherein:

FIG. 6 is an illustration of a codec including an encoder and a decoder implemented to function pursuant to the present disclosure;

FIG. 7 is an illustration of steps of a method of encoding data as executed in the encoder of FIG. 6; and FIG. 8 is an illustration of steps of a method of decoding data as executed in the decoder of FIG. 6.

When describing embodiments of the present disclosure, following acronyms and definitions will be used, as provided in Table 3:

TABLE 3

Acronyms and definitions

| Acronym | Description |
|---|---|
| ADC | Analog-to-digital converter |
| Codec | Encoder and corresponding decoder for digital data |
| DAC | Digital-to-analog converter |
| DB | Database in Random Access Memory (RAM) or Read Only Memory (ROM) |
| DC | DC-component of a given image, namely a mean of the image, namely corresponding to an average brightness and represents a lowest spatial frequency component of an image |
| RLE | Run-length encoding |
| ROI | Region of interest |
| ROM | Read Only Memory |
| VLC | Variable-length code |

In overview, with reference to FIG. 6, the present disclosure is concerned with an encoder 1010 and its associated method of operation; beneficially, the encoder 1010 is implemented as a direct ODelta encoder. Moreover, the present disclosure is also concerned with a corresponding decoder 1020; beneficially, the decoder 1020 is implemented as an inverse ODelta decoder. Embodiments of the disclosure beneficially employ a direct ODelta operator which is a bit-optimized version of the aforementioned known Delta encoding method as well as a range-optimized version for other data. ODelta encoding is used in computing hardware or dedicated digital hardware that employs variable-length data words, for example 8/16/32/64 bits, and/or employs variable-length encoding of 8/16/32/64 bit data elements whose original value is expressed in a range of 1 to 64 bits, and a corresponding encoded value is generated with 1 to 64 bits. Of course, the encoder 1010 and the decoder 1020 are, in any case, aware of which sort of number values are contained in data DA1, for example original data, and therefore its definition or transmission will not be further elucidated here. It is merely assumed that a number range (MIN and MAX) is known, and that the data DA1 can be utilized.

Known Delta coding methods increase the range of values from original (MIN to MAX) to a result (MIN−MAX to MAX−MIN). This means that it is also creating negative values when the original data contains only positive values. The ODelta operator pursuant to the present disclosure never creates a value that is not in a range of corresponding original values, and so it does not increase a used data range, and thus is beneficially employed when executing, for example, entropy reduction and associated data compression. For example, known Delta encoding methods operate with streams of 5-bit data, namely in a range of values from 0 to 31, such that data values generated by such Delta encoding methods will be in a range of −31 to +31, namely 63 values which is substantially expressible using 6 (namely, sign bit+5 bits) bits; in contradistinction, the direct ODelta generated values are still in a range of 0 to 31 when generated from aforesaid streams of 5-bit data. Moreover, whereas known methods of Delta encoding are not possible to be implemented recursively, the direct, or inverse, ODelta operator pursuant to the present disclosure is susceptible to being implemented recursively and yet it still preserves the used range of values. The range of values does not need to be bit-exact, for example values of 0 to 31 are defined by 5 bits; the ODelta operator is able to use any range of values, for example a range of values from 0 to 25, whilst still operating properly.

In principle, the ODelta methods herewith described are always able to function directly on a basis of an existing data range, of which will be given an example below. The ODelta methods can also be enhanced by delivering information indicative of a lowest occurring number value in the data ("lowValue") and a highest occurring number value in the data ("highValue"). It is to be noted that lowValue>=MIN, and highValue<=MAX, and that these values are optional.

Two examples of direct and inverse ODelta operators pursuant to the present disclosure will be described below. A first example of the direct and inverse ODelta operators is efficient and relatively simple to implement, for example in electronic hardware and/or computing hardware operable to execute one or more software products recorded on non-transient (non-transitory) machine-readable data storage media.

When implementing direct or inverse ODelta operators pursuant to the present disclosure, beneficially all of an original sequence of data values are positive and the lowest value is 0. Optionally, some offset value, namely a pre-offset value or a post-offset value, can be employed to shift the data values so that they are all positive in value and the lowest value is "0". The ODelta operator pursuant to the present disclosure is susceptible to being employed with all types of data in a direct manner; it is typically capable of providing data compression, namely reducing communicated data rate, because, when the offset value is added to all values or subtracted from all values, the range of data values might be defined using fewer bits. For example, original data values, prior to an application of the direct or inverse ODelta operator, are in a range from −11 to +18; such a range can be translated to a range of 0 to 29 by using an offset value of +11 and the translated range thereafter described by 5-bits. When such a pre-offset value or post-offset value is not employed, the original data values require at least 6 bits to describe them, and often, in practice, a full 8-bit signed byte is employed for convenience.

A similar optimization of data range is also possible when using a generalized direct or inverse ODelta operator. Thus, if the direct or inverse ODelta operator, or some other method, creates the data values that can be presented with an offset value smaller than the full range of values, then that range optimization can be implemented in any phase in the ODelta encoding method. When the offset value, whether negative or positive in sign, is used, it has also to be delivered from the encoder 1010 to the decoder 1020 as elucidated later with reference to FIG. 6, FIG. 7 and FIG. 8.

The direct ODelta operator is susceptible to being implemented in a 1-bit manner, for example for encoding the original data DA1 in a bit-by-bit manner; in such a 1-bit manner, a method 1 and a method 3, as will described in greater detail below, create a value "0" when there is no change in bit values in original data DA1 in FIG. 6, and a value "1" when a change in bit values in the original data DA1 occurs. The prediction for the first bit in the original data is optionally a value "0", and so the value of the first bit in the original data DA1 is preserved. It is also alternatively optionally possible to employ a predicted value first bit in the original data as a value "1", but such a choice does not provide any coding benefits; for this reason, no selection needs to be delivered when the prediction is optionally always assumed to be a value "0" by default for 1-bit data, namely a pre-defined value "0" is employed by the encoder 1010 and the decoder 1020, thereby avoiding a need for this prediction to be communicated and thus resulting in improved data compression.

An example of direct ODelta encoding pursuant to the present disclosure will now be described. An exemplary original sequence of bits, namely twenty seven bits, including seventeen "1's" and twenty "0's", is provided in Equation 1 (Eq. 1) as follows:

$$0\;1\;0\;1\;0\;1\;1\;0\;0\;1\;0\;0\;0\;1\;0\;1\;0\;0\;0\;0\;0\;0\;0\;0\;0\;0\;0 \\ 0\;1\;1\;1\;1\;1\;1\;1\;1\;1\;1 \qquad \text{Eq. 1}$$

whose entropy E is calculable from Equation 2 (Eq. 2):

$$E=17*\log_{10}(37/17)+20*(37/20)=11.08523 \qquad \text{Eq. 2}$$

A number of bits, namely Min_bit, required to code the entropy E in Equation 2 (Eq. 2) is calculable from Shannon's source coding theorem, as described in documents P7 and P8 of Table 4, as provided in Equation 3 (Eq. 3):

$$\text{Min\_bits} = \frac{E}{\log_{10}(2)} = 36.82 \text{ bits} \qquad \text{Eq. 3}$$

When the original sequence of bits is subject to a direct ODelta operator as aforementioned, namely the method 1 and the method 3, there is generated a sequence of bits as follows, including thirty seven bits of which there are thirteen "1's" and twenty four "0's":

$$0\;1\;1\;1\;1\;1\;0\;1\;0\;1\;1\;0\;0\;1\;1\;1\;1\;0\;0\;0\;0\;0\;0\;0\;0\;0 \\ 0\;1\;0\;0\;0\;0\;0\;0\;0\;0\;0 \qquad \text{Eq. 4}$$

whose entropy E is calculable from Equation 5 (Eq. 5):

$$E=13*\log_{10}(37/13)+20*(37/24)=10.41713. \qquad \text{Eq. 5}$$

which is expressible in a minimum number of bits, namely Min_bits, according to Equation 6 (Eq. 6):

$$\text{Min\_bits} = \frac{E}{\log_{10}(2)} = 34.60 \text{ bits} \qquad \text{Eq. 6}$$

The sequence of bits in Equation 4 (Eq. 4) is beneficially subject to further encoding to achieve data compression, for example using at least one of: run-length encoding (RLE), Huffman coding, arithmetic encoding, range encoding, Entropy Modifier encoding or SRLE encoding.

The ODelta operator reduces an amount of bits required to represent the original data DA1 when its associated entropy coding method is applied, for example RLE or SRLE is used for the operated data, for example as in Equation 4 (Eq. 4), instead of the original data, for example as in Equation 1 (Eq. 1); this 1-bit direct ODelta operator, namely the method 1 and the method 3, creates "1's" when there are a lot of changes in the original sequence of bits in Equation 1 (Eq. 1), and it generates "0's" when there is a long stream of mutually similar bits in the original sequence of bits in Equation 1 (Eq. 1).

The inverse version of the ODelta operator, namely inverses of the method 1 and the method 3, changes a bit value from a value "0" to a value "1", or from a value "1" to a value "0" as appropriate, when there is a value "1" in the encoded stream of data, namely in the data DA2, and does not change the bit value when there is a "0" value in the encoded stream of data DA2. When this ODelta operation is executed for the direct ODelta-operated bit stream of data DA2, the original stream of data DA1 is regenerated as the decoded data DA5; however, as aforementioned, additional coding such as VLC or Huffman coding is beneficially employed, which also needs to be taken into account; this means that data DA3 is generated from the data DA2 using a forward operation of entropy encoder and data DA4 is generated from the data DA3 using an inverse operation of entropy decoder.

Beneficially, the original stream of data DA1 is subdivided into two or more sections prior to encoding being applied thereto. Such subdivisions provide an opportunity for more optimization to be employed when encoding the original stream of data DA1. For example, such subdivision is beneficial because changeable sequences in the data DA1 generate more "1's" when directly ODelta encoded, namely utilizing the method 1 and the method 3, whereas flat unchangeable sequences, namely "flat" sequences, create more "0's", for example desirable for subsequent VRL encoding or Huffman encoding, so entropy E can be reduced for the entire bit stream constituting the data DA1 by dividing it into a plurality of sections which can be separately encoded as aforementioned.

An example of direct ODelta encoding pursuant to the present invention will next be described when a plurality of sections are employed which are mutually separately encoded. A first section including a sequence of original single bits includes sixteen bits in total, namely seven "1's" and nine "0's", as follows in Equation 7 (Eq. 7):

$$0\ 1\ 0\ 1\ 0\ 1\ 1\ 0\ 0\ 1\ 0\ 0\ 0\ 1\ 0\ 1 \qquad \text{Eq. 7}$$

wherein H(X)=4.7621 and B=15.82; "H" denotes entropy and "B" denotes Max_bit. When the Equation 7 (Eq. 7) sequence of original bits is subject to a direct ODelta operator, a sequence of corresponding transformed bits is provided as in Equation 8 (Eq. 8):

$$0\ 1\ 1\ 1\ 1\ 1\ 0\ 1\ 0\ 1\ 1\ 0\ 0\ 1\ 1\ 1 \qquad \text{Eq. 8}$$

wherein H(X)=4.3158 and B=14.34.

A second section including a sequence of original single bits includes as follows in Equation 9 (Eq. 9):

$$0\ 0\ 0\ 0\ 0\ 0\ 0\ 0\ 0\ 0\ 1\ 1\ 1\ 1\ 1\ 1\ 1\ 1\ 1\ 1 \qquad \text{Eq. 9}$$

wherein H(X)=6.3113 and B=20.97. When Equation 9 (Eq. 9) sequence of original bits is subject to a direct ODelta operator, a sequence of corresponding transformed bits is provided as in Equation 10 (Eq. 10):

$$0\ 0\ 0\ 0\ 0\ 0\ 0\ 0\ 0\ 0\ 1\ 0\ 0\ 0\ 0\ 0\ 0\ 0\ 0\ 0 \qquad \text{Eq. 10}$$

wherein H(X)=1.7460 and B=5.80. In these examples, as aforementioned, H(X) is representative of entropy E, and B is representative of a minimum number of bits required for coding.

The best compression in this example from Equation 7 (Eq. 7) and Equation 10 (Eq. 10) is achieved when both sections are separately subjected to a direct ODelta operator (namely encoding to 14.34 bits+5.80 bits=20.14 bits in total); this requires less bits than the 36.82 bits that were originally required, namely direct ODelta-operated bits requiring 34.60 bits, or the original number of bits required after splitting (=15.82 bits+20.97 bits=36.79 bits). Beneficially, splitting of an original stream of bits in the data DA1 into sections is executed automatically by analyzing entropy E of the original data DA1 and the corresponding entropy H of the modified data, namely as included in the data DA2, piece-by-piece.

Data compression is optionally implemented in a coarse manner merely by dividing portions of the data DA1 to a new section to be encoded, when there are multiple long run sections available in the data DA1, provided that there is a big enough area of data wherein bit values change rapidly along the sequence. Optionally, some sections of the data DA1 are encoded without employing the direct ODelta operator, for example if there is a long run of mutually similar bits with relatively few individual different bits therebetween; in such case, the direct ODelta operator does not impart significant benefit for data compression purposes.

Splitting the data DA1 into smaller sections has a disadvantage of generating an additional overhead which contributes data to the encoded data DA2. Such overhead includes, for example, information indicative of the amount of data bits or data bytes associated with every new section. However, it is always found to be necessary to transmit at least a certain amount of overhead data values, and thus there is only one extra overhead data value when a given data is split into two sections of data.

To achieve an encoded bit stream that can later be decoded, entropy encoding is beneficially implemented after the direct ODelta operator, for example VLC, Huffman coding, Arithmetic coding, range coding, RLE, SRLE, EM and similar. It is easier and more computationally efficient to execute optimization computations based on calculated entropy E and minimum bit estimation values in comparison to actual data encoding. Such an order of execution enables a considerable speed optimization, and often achieves an optimal data compression result in the encoded data DA2. Alternatively, it is feasible to execute entropy optimization in such a way that an original bit, alphabet, number, byte and word data, namely in the data DA1, is first coded with some other method to generate an entropy-optimized bit stream, and thereafter the direct ODelta operator is used to modify the entropy-optimized bit stream to provide corresponding encoded data, namely the data DA2. Moreover, this ODelta operated data can still be encoded with other encoding methods from the data DA2 to generate the data DA3.

The generalized direct ODelta operator employs a parameter that describes a range of values used in the data DA1, namely a value or number of bits that are needed to present the values. Moreover, the ODelta operator is employed in a method that enables the use of positive and negative offset values, in other words positive and negative "pedestal" values. For example, if data DA1 is presented with seven bits, namely has values from "0" to "127" supported, but it contains only values in a range of "60" to "115", then, when an offset value of −60 is applied to the data DA1, there is thereby generated translated data having values in a range of "0" to "55" that can also be represented as values containing only six bits, namely a degree of data compression is thereby feasible to achieve. The generalized direct ODelta operator thus improves results when a full range of data values is present in the data DA1, namely represented in seven bits and conventionally represented by 8-bit bytes.

Pursuant to the present disclosure, direct ODelta values, namely the method 1, are susceptible to being computed using a procedure as described by an excerpt of example software code as follows for data that has only positive values (lowValue=MIN=0 and highValue=MAX=127, wrapValue=127−0+1=128):

```
wrapValue = power(2, bits) = power(2, 7) = 128
predictionValue = (lowValue + highValue + 1) div 2 = (wrapValue + 1)
div 2 + lowValue = 64
for all pixels
begin
    if(originalValue >= predictionValue) then
        ODeltaValue = originalValue − predictionValue
    else
        ODeltaValue = wrapValue + originalValue − predictionValue
    predictionValue = originalValue
end
```

An example will now be provided to elucidate further the aforesaid ODelta operator. An original sequence of values is as follows in Equation 11 (Eq. 11):

65, 80, 126, 1, 62, 45, 89, 54, 66     Eq. 11

Corresponding Delta coding values are as follows in Equation 12 (Eq. 12):

65, 15, 46, −125, 61, −17, 44, −35, 12     Eq. 12

Corresponding direct ODelta coding values are as follows in Equation 13 (Eq. 13):

1, 15, 46, 3, 61, 111, 44, 93, 12     Eq. 13 wherein wraparound within a parameter wrapValue is employed.

An inverse ODelta operator, namely the method 1, is useable for generating inverse ODelta values, for example as implemented by example software code as follows:

```
    wrapValue = power(2, bits) = power(2, 7) = 128
    predictionValue = (wrapValue + 1) div 2 + lowValue = 64
    for all pixels
    begin
        ODeltaValue = originalValue + predictionValue
        if (ODeltaValue >= wrapValue) then
            ODeltaValue = ODeltaValue − wrapValue
        predictionValue = ODeltaValue
    end
```

When this software code is executed and applied to Equation 13 (Eq. 13), it generates values as provided in Equation 14 (Eq. 14):

65, 80, 126, 1, 62, 45, 89, 54, 66     Eq. 14

This example uses wrapValue as a power-of-two value. This is not mandatory and the wrapValue can also be any value that is larger than a highest data value, or value larger than the used range, if negative values are also available, or range is modified by pre-offset in a given sequence of data. There will be a further example later showing this feature.

To summarize the foregoing with reference to FIG. 6, the present disclosure is concerned with the encoder 1010 and the decoder 1020. Optionally, the encoder 1010 and the decoder 1020 are employed in combination as a codec indicated generally by 1030. The encoder 1010 is operable to receive original input data DA1 which is encoded using, for example, a direct ODelta method to generate corresponding encoded data DA2 or DA3. The encoded data DA2 or DA3 is optionally communicated via a communication network 1040 or stored on data storage media 1050, for example a data carrier such as an optical disc read-only-memory (ROM) or similar. The decoder 1020 is operable to receive the encoded data DA2 or DA3, for example streamed via the communication network 1040 or provided on the data storage media 1050, and to apply an inverse method, for example an inverse ODelta method, to generate corresponding decoded data DA5, for example substantially similar to the original data DA1. The encoder 1010 and the decoder 1020 are beneficially implemented using digital hardware, for example computing hardware which is operable to execute one or more software products, for example codes as provided as example embodiments in this description. Alternatively, the encoder 1010 and/or the decoder 1020 are implemented using dedicated digital hardware.

The ODelta method, as executed in the encoder 1010, employs steps as depicted in FIG. 7. In an optional first step 1100, the input data DA1 is processed to find a range of values of its data elements. In an optional second step 1110, from the range of values, an offset, namely a pre-offset, is computed for translating the data elements to a positive regime to generate a corresponding set of translated elements. In a third step 1120, the elements, optionally translated in the second step 1110, are then subject to direct ODelta encoding to generate corresponding ODelta encoded values. In a fourth step 1130, the ODelta encoded values and the optional offset value, minimum value (lowValue), and/or maximum value (highValue) are then separately encoded, for example using run-length encoding (RLE), range coding, or Huffman coding, to generate the data DA3 from data DA2. The offset value, minimum value (lowValue), and/or maximum value (HighValue) are not always compressible, thus requiring it to be delivered using a suitable amount of bits from the encoder 1010 to decoder 1020. Moreover, the offset value, minimum value (lowValue), and/or maximum value (highValue) are optional features for the direct ODelta operator; for example, the offset value, in certain situations has a value "0", lowValue has a value MIN, and highValue has a value MAX, namely no translation is applied and the full range is used. Especially, when the direct ODelta operator is implemented for 1-bit data, namely for encoding bit-by-bit, it does not need an offset value at all, and then steps 1100 and 1110 are always ignored. When an offset value is also used in the step 1110, the range value presenting the highest and lowest values should be updated within it. The number of different values, namely wrapValue, should be known also by the decoder 1020, or otherwise the encoder 1010 should deliver it to the decoder 1020 within compressed data. Optionally, the default wrapValue (=highValue−lowValue+1) is used in encoder and in decoder.

Optionally, at least one of the encoder 1010 and the decoder 1020 operate in a recursive manner, for example to find an optimal manner in which to subdivide the input data DA1 into sections for encoding so as to provide for optimal compression of the data DA1 to generate the encoded data DA2.

The inverse ODelta method as executed in the decoder 1020 employs steps as depicted in FIG. 8. In a first step 1200, the data DA2/DA3 or DA4 is subjected to inverse encoding to that which is employed in the aforesaid step 1130 to generate decoded ODelta data, wherein the decoded ODelta data has ODelta-encoded values and optionally have a separate offset value. In a second step 1210, the ODelta encoded values are decoded to generate a sequence of data elements. In a third step 1220, the sequence of data elements are translated using the optional pre-offset value to generate the decoded data DA5; in certain situation, such translation is set to a value "0", namely no translation is effectively applied. Again, it is possible to execute the method without needing to employ an offset value, for example when performing 1-bit encoding, namely bit-by-bit encoding, thereby enabling the step 1220 to be ignored. Furthermore, the decoder 1020 should also know the wrapValue to be able to decode data elements received thereat in a proper manner.

By employing the offset to achieve only positive values, more efficient data compression in the data DA2 or DA3 is capable of being achieved. If all the data values are already positive values, there is no need to add any offset value. Of course, negative offset values are optionally employed to reduce the available range, as shown in the next example, but it is not mandatory.

The methods in FIG. 7 and FIG. 8 can be optionally further optimized by using only the available values subject to ODelta coding. Such optimization requires that used values are known. For example, in an example in the foregoing, only values from 1 (=original minimum) to 126 (=original maximum) are present in the original data set DA1. The offset value is then 1 (−>lowValue=original minimum−offset=1−1=0 and highValue=original maximum−offset=126−1=125). When the pre-offset value has been reduced from the original data DA1, following values are thereby generated in Equation 15 (Eq. 15):

$$64, 79, 125, 0, 61, 44, 88, 53, 65 \qquad \text{Eq. 15}$$

From Equation 15 (Eq. 15), the maximum value of 125 is determined (highValue=original max−offset=126−1=125), such that the "number" (=maximum Delta value=highValue−lowValue) can now be 125, or wrapValue can be at smallest 126 (=number+1=highValue−lowValue+1). Now, it is necessary to store and/or deliver these values and then the previous example can be modified by changing process values as follows:

wrapValue=126 ("0" to "125"=>126 different values)

predictionValue=(highValue+lowValue+1) div 2=(wrapValue+1) div 2+lowValue=63

Corresponding direct ODelta operator values are provided in Equation 16 (Eq. 16):

$$1, 15, 46, 1, 61, 109, 44, 91, 12 \qquad \text{Eq. 16}$$

It will be appreciated that all "negative Delta values" are now reduced by a factor of 2 (namely=range change=128−126). Similarly, in the decoder 1020, the process values have to be changed as follows:

wrapValue=126 predictionValue=(wrapValue+1) div 2+lowValue=63

Corresponding inverse ODelta values are as follows in Equation 17 (Eq. 17):

$$64, 79, 125, 0, 61, 44, 88, 53, 65 \qquad \text{Eq. 17}$$

When the pre-offset value is added to Equation 17 (Eq. 17), a following result in Equation 18 (Eq. 18) is obtained corresponding to original data in Equation 15 (Eq. 15), namely:

$$65, 80, 126, 1, 62, 45, 89, 54, 66 \qquad \text{Eq. 18}$$

In this example, the range of values is nearly full, so there is a relative modest benefit derived from applying the direct ODelta operator with offset and maximum values (highValue). However, a reduction in entropy E can still be achieved, namely resulting in fewer values in a frequency table or in a code table when they are properly delivered. Greatest benefits can be achieved when the range is less used.

An example embodiment of a practical 1-bit direct and inverse ODelta method, namely the method 1 or the method 3, of encoding and decoding data will now be provided by way of executable computer software code; the method employs the aforesaid direct and inverse ODelta operators, namely the method 1 or the method 3. The software code is operable, when executed upon computing hardware, to process bits from one byte buffer to another byte buffer. In the software code, GetBit, SetBit and ClearBit functions always update a HeaderBits value. A HeaderIndex value is also updated when a next bit will be in a next byte. Optionally, the software code can be optimized, so that only one set of HeaderIndex and HeaderBits values are used for source and destination, such that values are updated only when a given bit is written to the destination buffer.

```
procedure EncodeODelta1u(APtrSrc : PByte; ASrcDstBitLen : PCardinal;
APtrDst : PByte)
var
    iSrcHeaderIndex, iSrcHeaderBits, iIndex,
    iDstHeaderIndex, iDstHeaderBits : Cardinal;
    bBit, bLastBit : Boolean;
begin
    // Reset offsets
    iSrcHeaderIndex := 0;
    iSrcHeaderBits := 0;
    iDstHeaderIndex := 0;
    iDstHeaderBits := 0;
    // Initialise delta value
    bLastBit := False;
    // Go through all bits
    for iIndex := 0 to ASrcDstBitLen^-1 do
    begin
        // Read bit
        bBit := GetBit(APtrSrc, @iSrcHeaderIndex, @iSrcHeaderBits);
        // Set destination bit if current source bit is different than
        previous source bit
        if (bBit <> bLastBit) then
        begin
            SetBit(APtrDst, @iDstHeaderIndex, @iDstHeaderBits);
            bLastBit := bBit;
        end
        else ClearBit(APtrDst, @iDstHeaderIndex, @iDstHeaderBits);
    end;
end;
function DecodeODelta1u(APtrSrc : PByte; ASrcDstBitLen : PCardinal;
APtrDst : PByte) : Boolean;
var
    iSrcHeaderIndex, iSrcHeaderBits, iIndex,
    iDstHeaderIndex, iDstHeaderBits : Cardinal;
    bBit, bLastBit : Boolean;
begin
    // Reset offsets
    iSrcHeaderIndex := 0;
    iSrcHeaderBits := 0;
```

-continued

```
        iDstHeaderIndex := 0;
        iDstHeaderBits := 0;
        // Initialise delta value
        bLastBit := False;
        // Go through all bits
        for iIndex := 0 to ASrcDstBitLen^-1 do
        begin
            // Read bit
            bBit := GetBit(APtrSrc, @iSrcHeaderIndex,
                @iSrcHeaderBits);
            // Change bit value if source bit is true
            if (bBit = True) then
            begin
                if (bLastBit = True) then
                    bLastBit := False
                else bLastBit := True;
            end;
            // Set destination bit based on bit value (True
            or False)
            if (bLastBit) then
                SetBit(APtrDst, @iDstHeaderIndex,
                    @iDstHeaderBits)
            else ClearBit(APtrDst, @iDstHeaderIndex,
                @iDstHeaderBits);
        end;
    end;
```

The aforementioned direct and inverse ODelta operators, namely the method 1 or the method 3, are beneficially employed to compress any type of data that is in a digital format, for example video data, image data, audio data, graphics data, seismological data, medical data, measurement values, reference numerals and masks. Moreover, one or more analog signals are also compressible using the direct ODelta operator when firstly converted to corresponding digital data, for example by using ADC's before the compression. When the inverse ODelta operator is used, DAC's can be used after the operation, if it is desired that the data be converted back to one or more analog signals. However, it will be appreciated that the direct ODelta operator by itself is not usually effective at compressing data, but is capable of providing effective data compression when employed in combination with other encoding methods, for example variable-length coding (VLC), arithmetic coding, range coding, run-length encoding, SRLE, Entropy Modifier and so forth. These encoding methods are used for data DA2 after the direct ODelta operator is employed in the encoder 1010. The encoded data DA2 has to be correspondingly decoded back before the resulting data is delivered to the inverse ODelta operator implemented in the decoder 1020. The ODelta operator can also be employed with other types of entropy modifiers. In certain situations, the direct ODelta operator can result in an increase in entropy E, and data compression algorithms are beneficially operable to employ the direct ODelta operator selectively for use in encoding data only when it provides a beneficial data compression performance, for example it is employed selectively based upon a nature of data to be compressed, for example applied selectively to selected portions of the input data DA1 as aforementioned.

The direct ODelta operator has been devised, for example, to be employed in combination with a block encoder as described in a U.S. patent application Ser. No. 13/584,005, whose contents are hereby incorporated by reference, and the inverse ODelta operator has been devised to be employed in combination with a block decoder as described in a U.S. patent application Ser. No. 13/584,047, whose contents are hereby incorporated by reference. Optionally, the direct ODelta operator and inverse ODelta operator are beneficially employed in combination with a multilevel coding method as described in U.S. patent application Ser. No. 13/657,382, whose contents are hereby incorporated by reference. Beneficially, all types of 1-bit data, for example present in the data DA1, that include binary states are subject to the 1-bit version of the direct ODelta operator to generate corresponding transformed data, which is then thereafter subjected to actual entropy encoding to generate the encoded data DA2 or DA3. Optionally, as aforementioned, the direct ODelta operator is employed selectively depending upon a nature of the original data DA1.

Optionally, it is feasible to employ other methods of modifying entropy of data before or after the direct ODelta operator. For example, the direct ODelta operator can also be used directly for multi-bit data within a generalized version of the direct ODelta operator. Moreover, the aforesaid 1-bit version of the direct ODelta operator is beneficially employed for multi-bit data, after all used bits are first put into a serial sequence of bits.

When multiple methods are employed for data compression in conjunction with the direct ODelta operator in the encoder 1010, corresponding inverse operations are performed in reverse order in the decoder 1020, for example:

The following sequence of methods are employed in the encoder 1010:

[data DA1]=>direct ODelta (method 2)

=>VLC-

=>EM

=>Arithmetic coding

=>[data DA3]                                              Eq. 19

The following inverse sequence of methods are employed in the decoder 1020:

[data DA3]=>inverse Arithmetic coding

=>inverse EM

=>inverse VLC

=>inverse ODelta (method2)

=>[data DA5]                                              Eq. 20 wherein "VLC" denotes variable-length coding, and "EM" denotes entropy modifying.

The ODelta operator as described in the foregoing is reversible and lossless. Moreover, the ODelta operator is optionally susceptible to being implemented specifically for 1-bit data streams, for example when performing bit-by-bit encoding, but also for other data. Beneficially, all types of data are susceptible to being processed using a generalized version of the direct ODelta operator. Beneficially, the direct ODelta operator is employed when data is to be compressed, and a corresponding inverse ODelta operator is employed when compressed data is to be decompressed. Optionally, when the ODelta operator is employed, the direct ODelta operator and its corresponding inverse operation are employed in a reverse order; in other words, the inverse ODelta operator is performed temporally first on an original bit stream, thereafter followed by the direct ODelta operator, for regenerating the original bit stream. One ODelta operator increases entropy and the other ODelta operator decreases entropy. It is a very rare case that the direct ODelta operator should not modify entropy at all, and then neither inverse ODelta operator modifies entropy. It is to be noted that the when the direct and inverse ODelta operators are used, for example for the method 1, then the inverse order of these operations are similar to the normal order of the method 4. Similar change of order is possible also with the method 2 and the method 3.

In the 1-bit version, namely for encoding data in a bit-by-bit manner, the direct ODelta operator beneficially starts without prediction, namely it assumes by default a prediction of an initial "0" value. In a generalized version, the ODelta operator starts with a prediction that represents half of a usable data range; for example, if 5-bits are used for input data values in the data D1, namely thirty two different values in a range from "0" to "31", the prediction value is 32/2=16. Beneficially, the ODelta operator needs to be provided with information regarding a useable data range for data elements to be processed using the operator.

Embodiments of the disclosure described in the foregoing make it possible to reduce the entropy E that is presented in the data DA1 as bits or any digital values. The direct ODelta operator nearly always provides improved entropy reduction as compared to Delta coding. Only the case where Delta coding is used together with byte wraparound, and the difference ODelta operation with original prediction (method 1) uses the values wrapValue=256, lowValue=MIN=0, and highValue=MAX=255, produces the identical output result within it. If another direct ODelta method is used, or if the entire data range is not available in the input data, then the ODelta operator produces better results by to sending the selected method or lowValue and/or highValue, namely that modifies also wrapValue automatically. Smaller entropy enables data to be compressed with higher data compression ratios. Higher data compression ratios enable smaller capacity data storage to be employed, and also enable slower data bandwidths to be employed when communicating compressed data, with corresponding reduction in energy consumption.

In the foregoing, it will be appreciated that a form of difference and sum computation is executed in the encoder 1010, and a corresponding inverse computation is performed in the decoder 1020. It is also possible to use another prediction method used in the encoder 1010, and a corresponding inverse prediction is then performed in the decoder 1020. This means that there are actually at least four different direct ODelta methods as well as at least four corresponding inverse ODelta methods. A detailed and exact description of these methods follows. Optionally, the computations are performed in a recursive manner to obtain a higher degree of data compression in the encoded data DA2 (or DA3). When executing such recursive computations, a changing number range is employed as a function of how many recursive computations have been employed. For example, in the encoder 1010, a following sequence of computations is performed on the data DA1 to generate the encoded data DA2 (or DA3):

[Data DA1] edirect ODelta (method 3)=> edirect ODelta (method 3)=> eEM=> edirect ODelta (method 1)=> eVLC [Data DA3]   Eq. 21 and corresponding inverse operations are performed in the decoder 1020:

[Data DA3] dVLC=> dinverse ODelta (method 1)=> dEM=> dinverse ODelta (method 3)=> dinverse ODelta (method 3) [Data DA5]   Eq. 22

Each time data is operated upon in these four methods, as denoted by Equations 21 (Eq. 21 corresponding to the method 1), Equation 22 (Eq. 22 corresponding to the method 2), Equation 23 (Eq. 23 corresponding to the method 3), and Equation 24 (Eq. 24 corresponding to the method 4), it is optionally possible to try to use all methods, because one of these methods might decrease entropy of data being processed more than the other methods. Upon optimizing the use of methods within the encoder 1010 and/or the decoder 1020, it is advantageous to use the same or different methods as many times and as long as the selected method, or methods, decrease entropy, as compared to the amount of information in the data required. Thus the methods 1 to 4 are useable for encoding numerical values, wherein "numerical values" encompasses in its definition 1-bit data as well as non-binary numbers, as in encoded streams of bits in a bit-by-bit manner, as well as multi-bit values The difference operation represents a remainder of consecutive number values; correspondingly, the sum operation represents a sum of consecutive number values. These operations as executed in the encoder 1010 have their own corresponding inverse operations in the decoder 1020. The difference or sum can be computed based on the current input value and the previous input or result value that is used as a prediction value. Other prediction values could also be used and they might, for example, use earlier input and output values in the encoder 1010 to create the prediction as long as it is reversible to do so also in the decoder 1020.

None of such methods compress data significantly within the encoder 1010 and decoder 1020, but all methods are beneficially employed to reduce entropy, so that some other compression method can then compress the entropy-reduced data more efficiently. Such other compression method is optionally at least one of: Huffman coding, arithmetic coding, range coding, RLE coding, SRLE coding, entropy modifier coding. However, for all methods, it is necessary to communicate a few number values with which the operation and its inverse operation can always be executed exactly, for example if lossless compression and subsequent lossless decompression of data is to be achieved. Of course, the encoder 1010 and the decoder 1020 have information regarding which sort of number values are contained in the input data DA1. Beneficially, it is assumed that the number range, namely defined by MIN and MAX, is known. In principle, the methods can always function directly on the basis of an existing data range. The number values that the operations need are the lowest occurring number value (lowValue) and the highest occurring number value (highValue); lowValue is greater than or equal to MIN, and highValue is less than or equal to MAX.

On a basis of these values, other necessary number values can be derived. Beneficially, these values are communicated in various forms, wherein missing values are beneficially computed. For example, if two values from a set ["lowValue", "highValue", "number"] are known, the "number" is [highValue−lowValue], then a third value can be computed therefrom. Omitting certain values in the data DA2, and then deriving them in the decoder 1020 is capable of providing greater data compression in the data DA2.

In addition to these values, a number P is required which can be used as a previous value in computation of the first value, namely "prediction". A value between "0" and a "number" value can always be chosen for the number P, namely "prediction". Moreover, the aforesaid operations need to be provided with the value "wrapValue", in order to function recoverably when decoding the data DA2/DA3 or DA4 in the decoder 1020, namely to shrink a value range that the operations generate to be as small as possible. However, this "wrapValue" has to be larger than the "number", and beneficially it will have a value "number"+1. Optionally, depending a nature of the data DA1, the first "prediction" value can be chosen to be "0" as aforementioned, for example if the data DA1 is assumed to contain more small values than larger ones; alternatively, the first "prediction" value can be chosen to be equal to the "number", if the data DA1 is assumed to contain more larger values than smaller ones. In an event that an assumption is not made for the magnitude of values, then it is desirable to use a value "(wrapValue+1) div 2+lowValue" for the "prediction" value.

Examples of operations performed in computing hardware when implementing embodiments of the present disclosure will now be described.

In the encoder 1010, the first direct difference operation, namely the method 1, is beneficially implemented as follows; for all data values, an output value, namely "result", that corresponds to the input value, namely "original" value, is computed in a software loop:

result=original−prediction if result<lowValue then result=result+wrapValue

Finally, the prediction value for the next input is set to be equal to the current input, namely:

prediction=original

In the decoder 1020, the first inverse difference operation, namely the method 1, is beneficially implemented as follows: for all data values, an output value, namely "result", that corresponds to the input value, namely "original" value, is computed in a software loop:

result=original+prediction if result>highValue then result=result−wrapValue

Finally, the prediction value for the next input is set to be equal to the current result, namely:

prediction=result

In the encoder 1010, the second direct difference operation, namely the method 2, is beneficially implemented as follows; for all data values, an output value, namely "result", that corresponds to the input value, namely "original" value, is computed in a software loop:

result=original−prediction if result<lowValue then result=result+wrapValue

Finally, the prediction value for the next input is set to be equal to the current result, namely:

prediction=result

In the decoder 1020, the second inverse difference operation, namely the method 2, is beneficially implemented as follows: for all data values, an output value, namely "result", that corresponds to the input value, namely "original" value, is computed in a software loop:

result=original+prediction if result>highValue then result=result−wrapValue

Finally, the prediction value for the next input is set to be equal to the current input, namely:

prediction=original

In the encoder 1010, the first direct sum operation, namely the method 3, is beneficially implemented as follows: for all data values, an input value, namely "result", that corresponds to the input value, namely "original", is computed in a software loop as follows:

result=original+prediction if result>highValue then result=result−wrapValue

Finally, the prediction value for the next input is set to be equal to the current input as follows:

prediction=original

In the decoder 1020, the first inverse sum operation, namely the method 3, is beneficially implemented as follows: for all data values, an input value, namely "result", that corresponds to the input value, namely "original", is computed in a software loop as follows:

result=original−prediction if result<lowValue then result=result+wrapValue

Finally, the prediction value for the next input is set to be equal to current result, namely:

prediction=result

In the encoder 1010, the second direct sum operation, namely the method 4, is beneficially implemented as follows: for all data values, an input value, namely "result", that corresponds to the input value, namely "original", is computed in a software loop as follows:

result=original+prediction if result>highValue then result=result−wrapValue

Finally, the prediction value for the next input is set to be equal to the current result as follows:

prediction=result

In the decoder 1020, the second inverse sum operation, namely the method 4, is beneficially implemented as follows: for all data values, an input value, namely "result", that corresponds to the input value, namely "original", is computed in a software loop as follows:

result=original−prediction if result<lowValue then result=result+wrapValue

Finally, the prediction value for the next input is set to be equal to current input namely:

prediction=original

Such sum and difference operations, all four methods, are also applicable to 1-bit data, namely bit-by-bit, namely when implementing ODelta versions of the encoder 1010 and decoder 1020. In a situation of 1-bit data, the next values are already known by both the encoder 1010 and the decoder 1020, namely MIN=0, MAX=1. Moreover, it is beneficially assumed that lowValue=MIN=0, and highValue=MAX=1. Furthermore, in such case, the "number" is therefore [high- Value−lowValue=1-0=1], and wrapValue is beneficially chosen to be "number"+1=1+1=2. Beneficially, the prediction value is chosen to be a value "0", because there is only 1-bit data being considered that can only have positive values starting from lowValue=MIN=0. For 1-bit data, the method 1 and the method 3 yield mutually similar coding results. Similarly, the method 2 and the method 4 yield mutually similar coding results. Having such knowledge beneficially simplifies the information which needs to be sent in the data DA2, as various defaults can be assumed, namely it is only necessary to send information about the number of execution times of the difference operations, either the method 1 or the method 2, and the selected prediction (input value (method 1) or result value (method 2)), so that the decoder 1020 can execute the correct inverse difference operation a requisite number of times when decoding the data DA2, DA3 or DA4 to generate the decoded data DA5.

The first example that was created by using the method 1 or the method 3 that creates similar output, can also be processed by using either the method 2 or the method 4, which also create similar output. The result shown below can be achieved by those methods when applied to the data Eq 1:

0 1 1 0 0 1 0 0 0 1 1 1 1 0 0 1 1 1 1 1 1 1 1 1 1 1
1 0 1 0 1 0 1 0 1 0 1

This time, the processed data has twenty four "1"'s and thirteen "0"'s, namely the entropy is the same as in the first example, but the counts of "1" and "0" change places. This does not always occur, instead often the entropy changes as well between these different methods. For example, after the four first elements of data, the method 1 and/or the method 3 produces three "1"'s and one "0", whereas in the original data and the data that has been processed with the method 2 and/or the method 4 have two "1"'s and two "0"'s. Therefore, the method 1 and/or the method 3 in such case produce smaller entropy than the method 2 and/or the method 4, and also smaller entropy than originally.

In a multi-bit implementation, if the data DA1 includes values in a range from −64 to +63, then MIN=−64 and MAX=63. By assuming lowValue=MIN and highValue=MAX, the "number"=127 and wrapValue is beneficially chosen to be 128. However, when the data DA1 varies at random, the "prediction" value is beneficially set to a value [(wrapValue+1) div 2+lowValue=64+−64=0].

It will be appreciated that, if the first value is for example −1, the first coded value with the direct ODelta method 1, and/or the method 2, would be −1−0=−1, and correspondingly, with the direct ODelta method 3, and/or the method 4, −1+0=−1. The next values would then change according to how the data progresses, for example if the second value would be 5, then the direct ODelta method 1 would produce 5−−1=6, the direct ODelta method 2 would produce 5−−1=6, the direct ODelta method 3 would produce 5+−1=4, and the direct ODelta method 4 would produce 5+−1=4. The decoder 1020 would in this case be able to produce as the first value when using the inverse ODelta method 1, and/or the method 2, −1+0=−1 and with the inverse ODelta method 3, and/or the method 4, −1−0=−1. Correspondingly, the second value with the inverse ODelta method 1 would be 6+−1=5, with the inverse ODelta method 2 it would be 6+−1=5, with the inverse ODelta method 3 it would be 4−−1=5 and with the inverse ODelta it would be 4−−1=5.

Such a solution can then be optimized if the number range actually only contains values between −20 and +27. In this example case, it is feasible to transmit, for example, lowValue=−20 and high Value=27. If both are transmitted, it is feasible to calculate that number=47 and wrapValue is then chosen to be beneficially 48. Now, it is feasible to calculate the value 48 div 2+−20=4 for prediction. Then, the previous example would yield for example for the value −1 when the ODelta method1, or the method 2, is used: −1−4=−5 and with the ODelta method 3, or the method 4, −1+4=3. Similarly, the second value would be for the ODelta methods as (5−−1)=6, (5−−5)=10, (5+−1)=4, and (5+3)=8. Decoding in the decoder 1020 functions correctly again and yields the first value for method 1, and/or method 2, as −5+4=−1 and for method 3, and/or method 4, as 3−4=−1. Correspondingly, the second values for different methods would be decoded as (6+−1)=5, (10+−5)=5, (4−−1)=5, and (8−3)=5.

It will be appreciated that all the values in these examples above are inside the range, namely from −64 to +63 or from −20 to +27, and so it is not necessary to perform the correction term within these example values, but if any negative or positive change is big enough, then the correction to the data values have to be made by the given Equations 21 to 24 (Eq. 21 to Eq. 24) to keep the result values within the range. It is to be noted that the correction term here refers to the wraparound value.

When lowValue is known, coded values are beneficially arranged to start with 0 and to end with a value "number", for simplifying a coding table which must be sent from the encoder 1010 to the decoder 1020 with the entropy encoded data DA3. This operation is called post-offset, and this post-offset value has to be deleted from the coded data values after the entropy decoding and before the inverse ODelta operation to data DA4.

As mentioned earlier, it is also possible to implement the offset with the pre-offset functionality, where the original input data (DA1) is transformed into positive elements which can contain values from zero to "number" already before the actual execution of the ODelta method. Also in this situation, the information transmission that this operation requires is beneficial to perform in such a way that the "pre-offset" and ODelta method do not repeatedly transmit the same information, or ignore what is already known thanks to some other method. This pre-offset effect should be deleted from the decoded data after the inverse ODelta operation to create proper DA5 output data.

TABLE 4

| Known technical art | |
| --- | --- |
| Earlier document | Detail |
| P1 | "Variable-length code", Wikipedia (accessed 28 Nov. 2012) URL: http://en.wikipedia.org/wiki/Variable-length_code |
| P2 | "Run-length encoding", Wikipedia (accessed 28 Nov. 2012) URL: http://en.wikipedia.org/wiki/Run-length_encoding |

TABLE 4-continued

Known technical art

| Earlier document | Detail |
|---|---|
| P3 | "Huffman coding", Wikipedia (accessed 28 Nov. 2012) URL: http://en.wikipedia.org/wiki/Huffman_coding |
| P4 | "Arithmetic coding", Wikipedia (accessed 28 Nov. 2012) URL: http://en.wikipedia.org/wiki/Arithmetic_coding |
| P5 | "A Mathematic Theory of Communication", Shannon, Claude E. (1948) (accessed 28 Nov. 2012) URL: http://cm:bell-labs.com/cm/ms/what/shannonday/shannon1948.pdf |
| P6 | "Delta encoding", Wikipedia (accessed 28 Nov. 2012) URL: http://en.wikipedia.org/wiki/Delta_coding |
| P7 | Shannon's source coding theorem; Wiikipedia (accessed 28 Nov. 2012) URL: http://en.wikipedia.org/wiki/Source_coding_theorem |
| P8 | "Entropy" - Wikipedia (accessed 28 Nov. 2012) URL: http://en.wikipedia.org/wiki/Entropy |

Appendix 2: Overview of Block Encoder

The block encoder is described in patent document GB2503295, whose contents are hereby incorporated by reference. There is provided a method of encoding input data, and an encoder operable to encode input data, The method of encoding input data to generate corresponding encoded output data, is characterized in that the method includes steps of:
(a) sub-dividing the input data into a plurality of blocks or packets, the blocks or packets having a size depending upon a nature of their content, and the blocks or packets being of one or more sizes;
(b) applying a plurality of transformations to content of the blocks or packets to generate corresponding transformed data;
(c) checking a quality of representation of the transformed data of the blocks or packets compared to the content of the blocks or packets prior to application of the transformations to determine whether or not the quality of representation of the transformed data satisfies one or more quality criteria;
(d) in an event that the quality of representation of the transformed data of the one or more blocks or packets does not satisfy the one or more quality criteria, sub-dividing and/or combining the one or more blocks or packets further and repeating step (b); and
(e) in an event that the quality of representation of the transformed data of the one or more blocks or packets satisfies the one or more quality criteria, outputting the transformed data to provide the encoded output data representative of the input data to be encoded.

The encoder operable to encode input data to generate corresponding encoded output data is characterized in that the encoder includes data processing hardware which is operable:
(a) to sub-divide the input data into a plurality of blocks or packets, the blocks or packets having a size depending upon a nature of their content, and the blocks or packets being of one or more sizes;
(b) to apply at least one transformation to content of the blocks or packets to generate corresponding transformed data;
(c) to check a quality of representation of the transformed data of the blocks or packets compared to the content of the blocks or packets prior to application of the transformations to determine whether or not the quality of representation of the transformed data satisfies one or more quality criteria;
(d) in an event that the quality of representation of the transformed data of the one or more blocks or packets does not satisfy the one or more quality criteria, to sub-divide and/or to combine the one or more blocks or packets further and repeating step (b); and
(e) in an event that the quality of representation of the transformed data of the one or more blocks or packets satisfies the one or more quality criteria, to output the transformed data to provide the encoded output data representative of the input data to be encoded.

Appendix 3: Overview of Block Decoder

An overview of a block decoder is also described in a patent document GB2505169, whose contents are hereby incorporated by reference. There is provided a method of decoding encoded input data, and a decoder which is operable to decode input data.

The method of decoding encoded input data to generate corresponding decoded output data is characterized in that the method includes steps of:
(a) processing the encoded input data to extract therefrom header information indicative of encoded data pertaining to blocks and/or packets included in the encoded input data, the header information including data indicative of one or more transformations employed to encode and compress original block and/or packet data for inclusion as the encoded data pertaining to the blocks and/or packets;
(b) preparing a data field in a data storage arrangement for receiving decoded block and/or packet content;
(c) retrieving information describing the one or more transformations and then applying an inverse of the one or more transformations for decoding the encoded and compressed original block and/or packet data to generate corresponding decoded block and/or packet content for populating the data field;
(d) splitting and/or combining blocks and/or packets in the data field according to splitting and/or combining information included in the encoded input data; and
(e) when the encoded input data has been at least partially decoded, outputting data from the data field as the decoded output data.

The decoder which is operable to decode input data to generate corresponding decoded output data is characterized in that the decoder includes data processing hardware which is operable:
(a) to process the encoded input data to extract therefrom header information indicative of encoded data pertaining to blocks and/or packets included in the encoded input data, the header information including data indicative of one or more transformations employed to encode and compress original block and/or packet data for inclusion as the encoded data pertaining to the blocks and/or packets;

(b) to prepare a data field in a data storage arrangement for receiving decoded block and/or packet content;

(c) to retrieve information describing the one or more transformations and then applying an inverse of the one or more transformations for decoding the encoded and compressed original block and/or packet data to generate corresponding decoded block and/or packet content for populating the data field;

(d) to split and/or combine blocks and/or packets in the data field according to splitting and/or combining information included in the encoded input data; and (e) when the encoded input data has been at least partially decoded, to output data from the data field as the decoded output data.

The invention claimed is:

1. An encoder for encoding input data to generate corresponding encoded data, characterized in that the encoder is operable to select at least one Delta encoding algorithm to process the input data and to encode original values of at least a portion thereof into delta values that are expressed using a value range that is not increased as compared to a value range of the original values, and to generate one or more predictors for use in encoding one or more subsequent portions of the input data, wherein the encoder is also operable to encode data generated by the at least one Delta encoding algorithm (ODelta, DDelta, IDelta, PDelta) and the one or more predictors by employing at least one entropy encoding algorithm to generate the encoded data, wherein the one or more predictors include at least one of:

(i) one or more temporal predictors;

(ii) one or more local spatial predictors which are subject to quantization; or (iii) one or more local spatial predictors utilizing pre-computed values, wherein the at least one Delta encoding algorithm encoding the original values into delta values that are expressed using the value range that is not increased as compared to the value range of original values is implemented by at least one of (a) using a data processing arrangement for applying to the input data a form of differential and/or sum encoding to generate one or more corresponding encoded sequences, and using the data processing arrangement to subject the one or more corresponding encoded sequences to a wrap around a maximum value and/or a wrap around a minimum value, for generating the encoded output data (=ODelta);

(b) expressing the delta values without sign, when the delta values include only negative values (=DDelta) or include only positive values (=IDelta); or (c) using an offset value to express the delta values within the value range of the original values (=PDelta).

2. An encoder as claimed in claim 1, wherein information which is indicative of a selection of the at least one Delta encoding algorithm (ODelta, DDelta, IDelta, PDelta) is included in the encoded data.

3. An encoder as claimed in claim 1, characterized in that the encoder is operable to employ at least one quantization algorithm when encoding the input data to generate the encoded data, wherein the at least one quantization algorithm results in the encoder providing lossy encoding of the input data.

4. An encoder as claimed in claim 1, characterized in that the encoder is operable to employ different algorithms for encoding data of different data structures present in the input data.

5. An encoder as claimed in claim 1, characterized in that the encoder is operable to employ RD optimization when encoding the input data block-by-block.

6. An encoder as claimed in claim 5, characterized in that the RD optimization is computed within the encoder to minimize a value V of an equation:

$$V = D + \lambda * R$$

wherein the distortion is a sum of squares error between the input data and a representation of the input data encoded into the encoded data and decoded into the decoded data and wherein a rate represents an amount of encoded data measured as bits.

7. An encoder as claimed in claim 1, characterized in that the at least one Delta encoding algorithm (ODelta, DDelta, Delta, PDelta) and/or the at least one entropy encoding algorithm is operable to employ at least one of: DC methods, slide methods, multilevel methods, DCT methods, line methods, scale methods, database methods, Range coding, Huffman coding, RLE coding, SRLE coding.

8. An encoder as claimed in claim 1, characterized in that the encoder is operable to encode the input data including data structures corresponding to at least one of: YUV channels, BGR channels.

9. An encoder as claimed in claim 8, characterized in that the encoder is operable to encode data of the channels in an order Y, U, V or in an order G, B, R.

10. An encoder as claimed in claim 1, characterized in that the encoder is operable to include data in the encoded data which is indicative of one or more encoding algorithms employed by the encoder to encode the input data to generate the encoded data.

11. A method of using an encoder for encoding input data to generate corresponding encoded data, characterized in that the method includes:

(i) using the encoder to select at least one Delta encoding algorithm (ODelta, DDelta, Delta, PDelta) to process the input data and to encode original values of at least a portion thereof into delta values that are expressed using a value range that is not increased as compared to a value range of the original values;

(ii) using the encoder to generate one or more predictors for use in encoding one or more subsequent portions of the input data; and (iii) using the encoder to encode data generated by the at least one Delta encoding algorithm and the one or more predictors by employing at least one entropy encoding algorithm to generate the encoded data, wherein the one or more predictors include at least one of:

(i) one or more temporal predictors;

(ii) one or more local spatial predictors which are subject to quantization; or (iii) one or more local spatial predictors utilizing pre-computed values, wherein the at least one Delta encoding algorithm encoding the original values into delta values that are expressed using the value range that is not increased as compared to the value range of original values is implemented by at least one of (a) using a data processing arrangement for applying to the input data a form of differential and/or sum encoding to generate one or more corresponding encoded sequences, and using the data processing arrangement to subject the one or more corresponding encoded sequences to a wrap around a maximum value and/or a wrap around a minimum value, for generating the encoded output data (=ODelta);

(b) expressing the delta values without sign, when the delta values include only negative values (=DDelta) or include only positive values (=IDelta); or (c) using an offset value to express the delta values within the value range of the original values (=PDelta).

12. A method as claimed in claim 11, characterized in that the method includes arranging for the encoder to employ at least one quantization algorithm when encoding the input data to generate the encoded data, wherein the at least one quantization algorithm results in the encoder providing lossy encoding of the input data.

13. A method as claimed in claim 11, characterized in that the method includes arranging for the encoder to employ different algorithms for encoding data of different data structures present in the input data.

14. A method as claimed in claim 11, characterized in that the method includes arranging for the encoder to employ RD optimization when encoding the input data block-by-block.

15. A method as claimed in claim 14, characterized in that the RD optimization is computed within the encoder to minimize a value V of an equation:

$$V=D+\lambda*R$$

wherein the distortion is a sum of squares error between the input data and a representation of the input data encoded into the encoded data and decoded into the decoded data, and wherein a rate represents an amount of encoded data measured as bits.

16. A method as claimed in claim 11, characterized in that the at least one Delta encoding algorithm (ODelta, DDelta, Delta, PDelta) and/or the at least one entropy encoding algorithm is operable to employ at least one of: DC methods, slide methods, multilevel methods, DCT methods, line methods, scale methods, database methods, Range coding, Huffman coding, RLE coding, SRLE coding.

17. A method as claimed in claim 11, characterized in that the method includes arranging for the encoder to encode the input data including data structures corresponding to at least one of: YUV channels, BGR channels.

18. A method as claimed in claim 17, characterized in that the method includes arranging for the encoder to encode data of the channels in an order Y, U, V or in an order G, B, R.

19. A method as claimed in claim 11, characterized in that the method includes arranging for the encoder to include data in the encoded data which is indicative of one or more encoding algorithms employed by the encoder to encode the input data to generate the encoded data.

20. A decoder for decoding encoded data to generate corresponding decoded data, characterized in that the decoder is operable to process the encoded data by applying at least one entropy decoding algorithm thereto to generate processed data, and to use one or more predictors in combination with at least one selected Delta decoding algorithm (inverse ODelta, inverse DDelta, inverse IDelta, inverse PDelta) to decode the processed data to generate the decoded data, wherein the processed data includes delta values that are expressed using a value range that is not increased as compared to a value range of original data from which the encoded data (E2) was generated based upon at least one selected Delta encoding algorithm corresponding to the at least one Delta decoding algorithm, wherein the one or more predictors include at least one of:
(i) one or more temporal predictors;
(ii) one or more local spatial predictors which are subject to quantization; or
(iii) one or more local spatial predictors utilizing pre-computed values, wherein the at least one Delta decoding algorithm is implemented by:

(a) using a data processing arrangement for applying to the encoded data a form of differential and/or sum decoding to generate one or more corresponding decoded sequences, and using the data processing arrangement to subject the one or more corresponding decoded sequences to a wrap around a maximum value and/or a wrap around a minimum value, for generating the decoded output data (=inverse ODelta);

(b) decoding the delta values, when the delta values include only negative values (=inverse DDelta) or include only positive values (=inverse Delta);

(c) using an offset value to decode the delta values expressed within the value range of the original values (=inverse PDelta).

21. A decoder as claimed in claim 20, characterized in that the decoder is operable to employ at least one quantization algorithm when decoding the encoded data to generate the decoded data, wherein the at least one quantization algorithm results in the decoder providing lossy decoding of the encoded data.

22. A decoder as claimed in claim 20, characterized in that the decoder is operable to employ mutually different algorithms for decoding data of mutually different data structures present in the encoded data.

23. A decoder as claimed in claim 20, characterized in that the at least one Delta decoding algorithm and/or the at least one entropy decoding algorithm (=inverse ODelta, inverse DDelta, inverse IDelta, inverse PDelta) is operable to employ at least one of: DC methods, slide methods, multilevel methods, DCT methods, line methods, scale methods, database methods, Range coding, Huffman coding, RLE coding, SRLE coding.

24. A decoder as claimed in claim 20, characterized in that the decoder is operable to decode the encoded data including data structures corresponding to at least one of: YUV channels, BGR channels.

25. A decoder as claimed in claim 24, characterized in that the decoder is operable to decode data of the channels in an order Y, U, V or in an order G, B, R.

26. A decoder as claimed in claim 20, characterized in that the decoder is operable to decode data included in the encoded data which is indicative of one or more Delta decoding algorithms to be employed by the decoder to decode the encoded data to generate the decoded data.

27. A method of decoding encoded data in a decoder to generate corresponding data, characterized in that the method of decoding includes processing the encoded data by applying at least one entropy decoding algorithm thereto to generate processed data, and using one or more predictors in combination with at least one selected Delta decoding algorithm (=inverse ODelta, inverse DDelta, inverse IDelta, inverse PDelta) to decode the processed data to generate the decoded data, wherein the processed data includes delta values that are expressed using a value range that is not increased as compared to a value range of original data from which the encoded data was generated based upon at least one selected Delta encoding algorithm corresponding to the at least one Delta decoding algorithm,
wherein the one or more predictors include at least one of:
(i) one or more temporal predictors;
(ii) one or more local spatial predictors which are subject to quantization; or
(iii) one or more local spatial predictors utilizing precomputed values,
wherein the at least one Delta decoding algorithm is implemented by:
(a) using a data processing arrangement for applying to the encoded data a form of differential and/or sum decoding to generate one or more corresponding decoded sequences, and using the data processing arrangement to subject the one or more corresponding decoded sequences to a wrap around a maximum value and/or a wrap around a minimum value, for generating the decoded output data (=inverse ODelta);
(b) decoding the delta values, when the delta values include only negative values (=inverse DDelta) or include only positive values (=inverse Delta);
(c) using an offset value to decode the delta values expressed within the value range of the original values (=inverse PDelta).

28. A computer program product comprising a non-transitory computer-readable storage medium having computer-readable instructions stored thereon, the computer-readable instructions being executable by a computerized device comprising processing hardware to execute a method of using an encoder for encoding input data to generate corresponding encoded data, characterized in that the method includes:
(i) using the encoder to select at least one Delta encoding algorithm (ODelta, DDelta, Delta, PDelta) to process the input data and to encode original values of at least a portion thereof into delta values that are expressed using a value range that is not increased as compared to a value range of the original values;
(ii) using the encoder to generate one or more predictors for use in encoding one or more subsequent portions of the input data; and
(iii) using the encoder to encode data generated by the at least one Delta encoding algorithm and the one or more predictors by employing at least one entropy encoding algorithm to generate the encoded data,
wherein the one or more predictors include at least one of:
(i) one or more temporal predictors;
(ii) one or more local spatial predictors which are subject to quantization; or
(iii) one or more local spatial predictors utilizing precomputed values,
wherein the at least one Delta encoding algorithm encoding the original values into delta values that are expressed using the value range that is not increased as compared to the value range of original values is implemented by at least one of
(a) using a data processing arrangement for applying to the input data a form of differential and/or sum encoding to generate one or more corresponding encoded sequences, and using the data processing arrangement to subject the one or more corresponding encoded sequences to a wrap around a maximum value and/or a wrap around a minimum value, for generating the encoded output data (=ODelta);
(b) expressing the delta values without sign, when the delta values include only negative values (=DDelta) or include only positive values (=IDelta); or
(c) using an offset value to express the delta values within the value range of the original values (=PDelta).

* * * * *